United States Patent
Liu

(10) Patent No.: US 11,485,889 B2
(45) Date of Patent: Nov. 1, 2022

(54) PARTIALLY SHAPED ABRASIVE PARTICLES, METHODS OF MANUFACTURE AND ARTICLES CONTAINING THE SAME

(71) Applicant: 3M INNOVATIVE PROPERTIES COMPANY, St. Paul, MN (US)

(72) Inventor: Yuyang Liu, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/594,358

(22) PCT Filed: Mar. 30, 2020

(86) PCT No.: PCT/IB2020/053001
§ 371 (c)(1),
(2) Date: Oct. 13, 2021

(87) PCT Pub. No.: WO2020/212788
PCT Pub. Date: Oct. 22, 2020

(65) Prior Publication Data
US 2022/0186100 A1 Jun. 16, 2022

Related U.S. Application Data

(60) Provisional application No. 62/833,865, filed on Apr. 15, 2019.

(51) Int. Cl.
*C09K 3/14* (2006.01)
*B24D 11/00* (2006.01)
*C01G 25/02* (2006.01)

(52) U.S. Cl.
CPC ............ *C09K 3/1436* (2013.01); *B24D 11/00* (2013.01); *C01G 25/02* (2013.01); *C09K 3/1409* (2013.01); *C01P 2004/30* (2013.01); *C01P 2004/64* (2013.01)

(58) Field of Classification Search
None
See application file for complete search history.

(56) References Cited

U.S. PATENT DOCUMENTS

| 3,918,217 A | 11/1975 | Oliver |
| 5,366,523 A | 11/1994 | Horst |
| 6,287,353 B1 | 9/2001 | Celikkaya |

(Continued)

FOREIGN PATENT DOCUMENTS

| DE | 202014101739 | 6/2014 |
| DE | 202014101741 | 6/2014 |

(Continued)

OTHER PUBLICATIONS

International Search Report for PCT International Application No. PCT/IB2020/053001, dated Jul. 2, 2020, 5 pages.

*Primary Examiner* — Pegah Parvini
*Assistant Examiner* — Ross J Christie
(74) *Attorney, Agent, or Firm* — Katherine M. Scholz

(57) ABSTRACT

Various embodiments disclosed relate to a partially shaped abrasive particle. The partially shaped abrasive particle includes a shaped portion, engineered to have a polygonal shape, and an irregular portion. The irregular portion is coupled to a base of the shaped portion, forming a single partially shaped abrasive particle.

17 Claims, 11 Drawing Sheets

(56) References Cited

U.S. PATENT DOCUMENTS

| | | | |
|---|---|---|---|
| 6,722,952 B2 * | 4/2004 | Goers | B24B 7/241 |
| | | | 451/41 |
| 8,142,531 B2 | 3/2012 | Adefris | |
| 8,142,532 B2 | 3/2012 | Erickson | |
| 8,728,185 B2 * | 5/2014 | Adefris | C09K 3/1418 |
| | | | 51/293 |
| 9,212,302 B2 | 12/2015 | Fischer | |
| 9,771,506 B2 * | 9/2017 | Yener | C09K 3/1418 |
| 9,776,302 B2 | 10/2017 | Keipert | |
| 9,803,119 B2 * | 10/2017 | Breder | B24D 3/14 |
| 2009/0165394 A1 | 7/2009 | Culler | |
| 2009/0169816 A1 * | 7/2009 | Erickson | B24D 3/00 |
| | | | 428/142 |
| 2010/0146867 A1 | 6/2010 | Boden | |
| 2010/0151195 A1 | 6/2010 | Culler | |
| 2010/0151201 A1 | 6/2010 | Erickson | |
| 2010/0319269 A1 | 12/2010 | Erickson | |
| 2012/0167481 A1 * | 7/2012 | Yener | C09K 3/1409 |
| | | | 51/307 |
| 2012/0227333 A1 * | 9/2012 | Adefris | B24D 11/00 |
| | | | 451/526 |
| 2013/0283705 A1 | 10/2013 | Fischer | |
| 2015/0089881 A1 * | 4/2015 | Stevenson | C09K 3/1409 |
| | | | 51/307 |
| 2015/0267097 A1 | 9/2015 | Rosenflanz | |
| 2016/0177154 A1 * | 6/2016 | Josseaux | B01J 2/26 |
| | | | 51/307 |

FOREIGN PATENT DOCUMENTS

| | | |
|---|---|---|
| EP | 2692813 | 2/2014 |
| EP | 2692814 | 2/2014 |
| EP | 2692815 | 2/2014 |
| EP | 2692816 | 2/2014 |
| EP | 2692817 | 2/2014 |
| EP | 2692818 | 2/2014 |
| EP | 2692819 | 2/2014 |
| EP | 2692820 | 2/2014 |
| EP | 2692821 | 2/2014 |
| WO | WO 2011-068714 | 6/2011 |
| WO | WO 2014-020068 | 2/2014 |
| WO | WO 2014-020075 | 2/2014 |
| WO | WO 2014-070468 | 5/2014 |
| WO | WO 2015-100018 | 7/2015 |
| WO | WO 2020-075005 | 4/2020 |

* cited by examiner

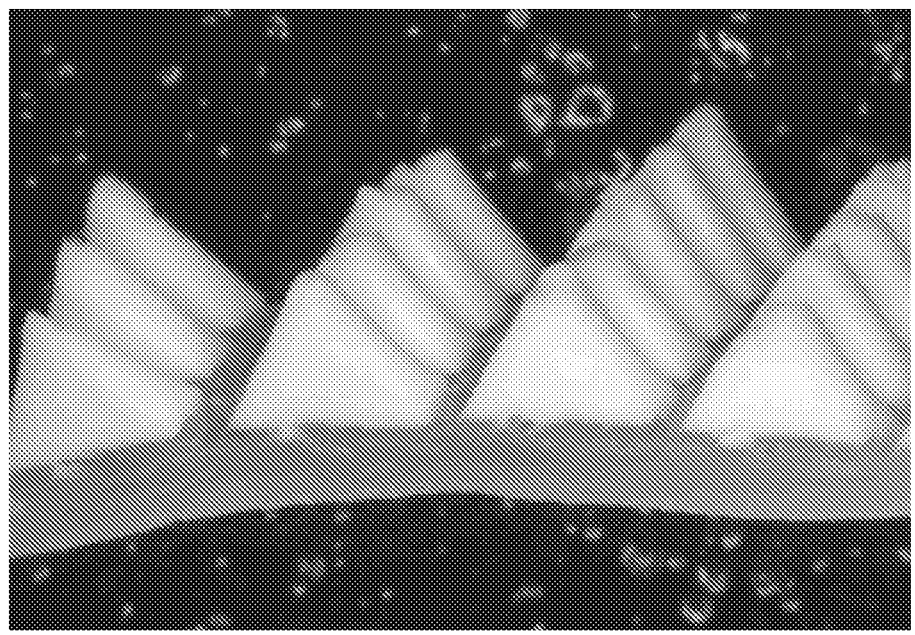
FIG. 9A  200μm
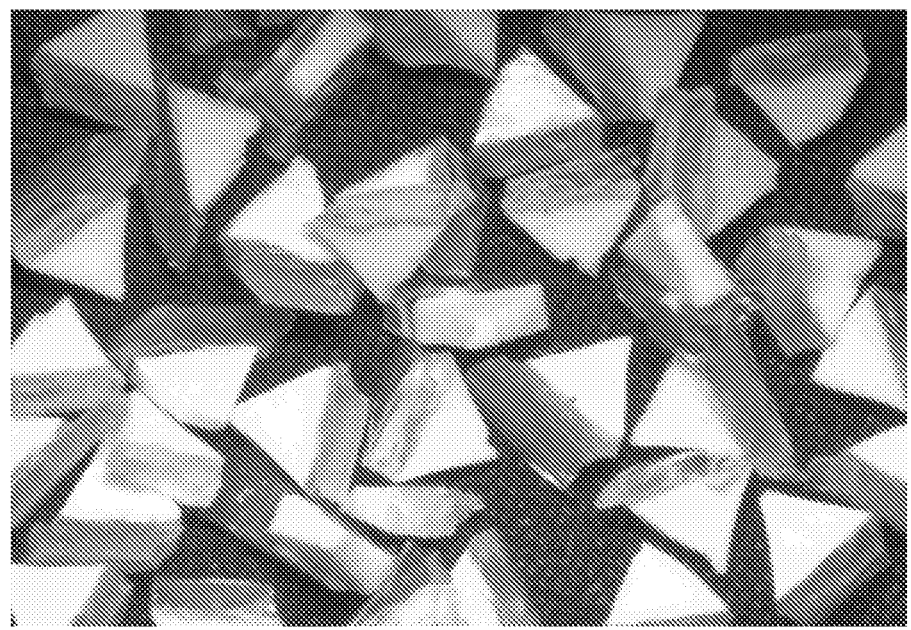
FIG. 9B  200μm

PARTIALLY SHAPED ABRASIVE PARTICLES, METHODS OF MANUFACTURE AND ARTICLES CONTAINING THE SAME

CROSS REFERENCE TO RELATED APPLICATIONS

This application is a national stage filing under 35 U.S.C. 371 of PCT/IB2020/053001, filed Mar. 30, 2020, which claims the benefit of U.S. Provisional Application No. 62/833,865, filed Apr. 15, 2019, the disclosure of which is incorporated by reference in its/their entirety herein.

BACKGROUND

Abrasive particles and abrasive articles including abrasive particles are useful for abrading, finishing, or grinding a wide variety of materials and surfaces in the manufacturing of goods. As such, there continues to be a need for improving the cost, performance, or life of abrasive particles or abrasive articles.

SUMMARY OF THE DISCLOSURE

Various embodiments disclosed relate to a partially shaped abrasive particle with a shaped portion engineered to have a polygonal shape and an irregular portion. The shaped portion is coupled to the irregular portion forming a single partially shaped abrasive particle.

Various further embodiments disclosed relate to a method of making a partially shaped abrasive particle. The method includes disposing an abrasive particle precursor composition in a mold cavity conforming to the negative image of the shaped portion of the partially shaped abrasive particle. The method further includes drying the abrasive particle precursor to form the partially shaped abrasive particle. In some embodiments the abrasive particle can optionally be subjected to a firing process.

Various further embodiments disclosed relate to an abrasive article containing partially shaped abrasive particles. The abrasive article includes a backing. The abrasive article further includes a plurality of shaped abrasive particles attached to the backing.

Various further embodiments disclosed relate to a method of making an abrasive article. The method includes adhering partially shaped abrasive particles to the backing such that the shaped portion of the partially shaped abrasive particles faces away from the backing.

There are many reasons to use the partially shaped abrasive particles and articles including the shaped abrasive particles described herein including the following non-limiting reasons. At least some embodiments described herein show improved shelling resistance compared to conventional precision shaped abrasive particles. At least some embodiments described herein illustrate abrasive articles with more exposed precision shaped particle for cutting. Additionally, some embodiments described herein have improved mineral production. Manufacturing of abrasive articles may also be improved by at least some embodiments described herein reduce cost through easier drop-coat manufacturing. The presence of the irregular portion helps to ensure correct orientation of the precision shaped abrasive portion of the abrasive particle. Further, because more of the precision shaped abrasive portion is available on the surface, articles incorporating such abrasive particles have a longer use life. Additionally, partially shaped abrasive particles may be easier to coat because the shaped portion of the abrasive particle is more exposed.

BRIEF DESCRIPTION OF THE FIGURES

The drawings illustrate generally, by way of example, but not by way of limitation, various embodiments discussed in the present document.

FIGS. 7-12 illustrate examples of manufactured partially shaped abrasive particles in accordance with embodiments described herein.

DETAILED DESCRIPTION

Figure 1:
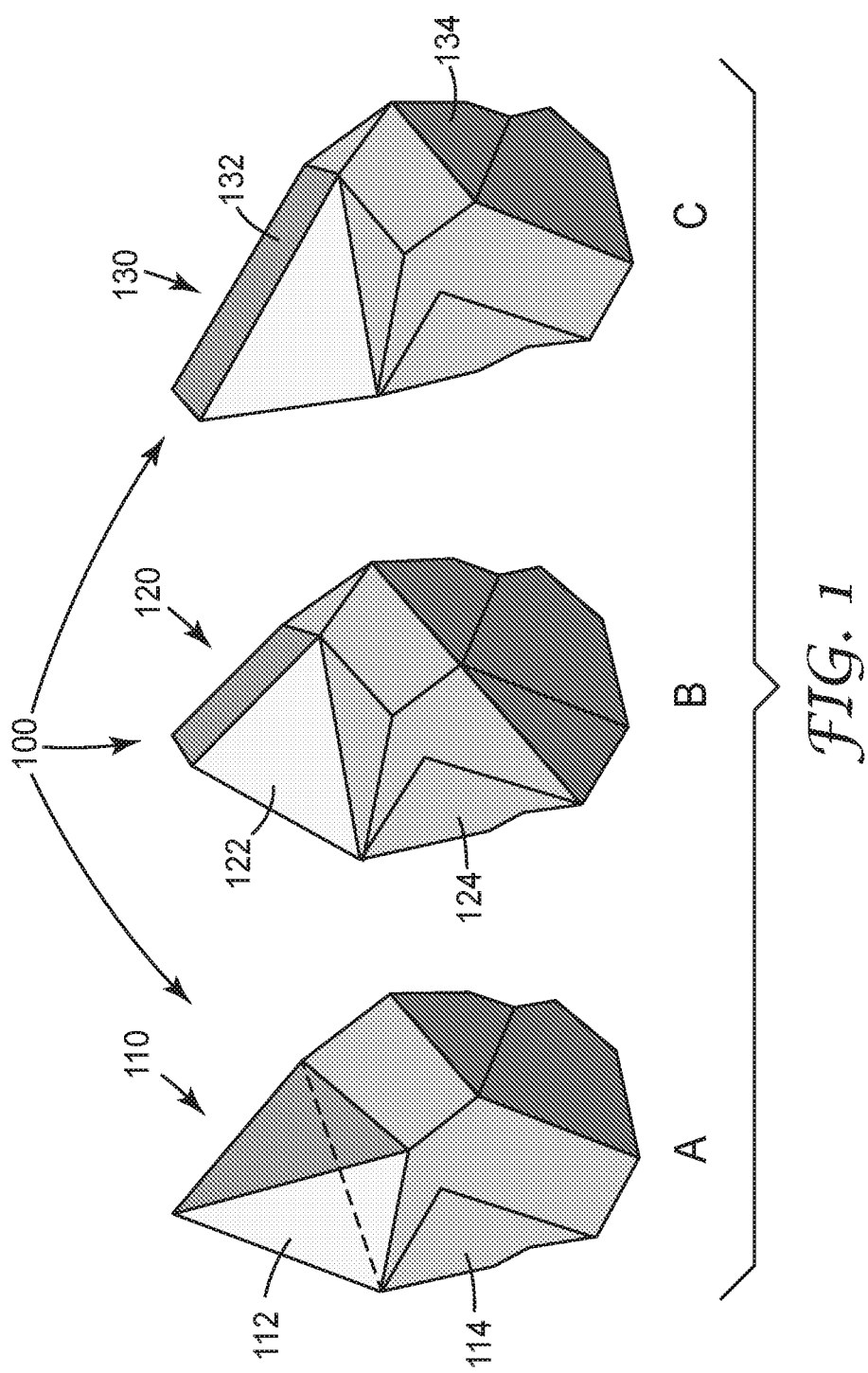
FIGS. 1A-1C illustrate examples of partially shaped abrasive particles in accordance with embodiments of the present invention.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

As used herein, the term "shaped abrasive particle," means an abrasive particle with at least a portion of the abrasive particle having a predetermined shape that is replicated from a mold cavity used to form the shaped precursor abrasive particle. Except in the case of abrasive shards (e.g. as described in US Patent Application Publication Nos. 2009/0169816 and 2009/0165394), the shaped abrasive particle will generally have a predetermined geometric shape that substantially replicates the mold cavity that was used to form the shaped abrasive particle. Shaped abrasive particle as used herein excludes abrasive particles obtained by a mechanical crushing operation.

A "partially shaped abrasive particle," means an abrasive particle with a shaped abrasive particle portion connected to a non-shaped portion. For example, the non-shaped portion may be created during a crushing operation. In some embodiments, 'connected' refers to a mechanical connection using a binding agent. However, in other embodiments, 'connected' means the shaped portion and the non-shaped (irregular) portion are created simultaneously as one monolith.

Partially Shaped Abrasive Particles

According to various embodiments of the present disclosure, shaped abrasive particles provide improved performance over conventional crushed abrasives. Controlling the shape of abrasive particles can control the resulting performance of an abrasive article incorporating said particles. However, surfaces of shaped abrasive particles are often smoother than surfaces on crushed particles, which results in less mechanical locking between the mineral and adhesive layer. This can cause shelling, which refers to the phenomenon of abrasive particles being released prematurely from a bond system. The bond system is intended to hold the abrasive particle throughout its useful life. The term shelling may have arisen based on the similar behavior of corn kernels being released when an ear of corn undergoes a shelling operation. While there are some exceptions, generally shelling of abrasive particles from an abrasive article is unwanted because it reduces the article's efficacy as the abrading surfaces decrease. The efficiency loss represented by shelling occurs in all abrasive products, including bonded abrasive products such as grinding wheels, non-woven abrasive products, and coated abrasive products. The loss is particularly noticeable in the coated abrasives space because substantially all of the abrasive particles are held on a backing by the bond system. Substantially each abrasive particle on a coated abrasive is exposed or nearly exposed. The loss of abrasive particle by shelling results in non-abrasive areas on the abrasive article, reducing abrasive efficiency and may result in uneven surface finishing.

Abrasive products used for high stock removal applications must be able to withstand high pressures and rotation speeds while still providing sufficient abrasive cut. Shelling can be significant in such scenarios.

Compared with precision shaped abrasive particles, conventional crushed mineral experiences less shelling because the rough surface of crushed mineral particles provides multiple locking sites for the adhesive holding the abrasive particle firmly during grinding applications.

Disclosed herein is a new type of abrasive particle which incorporates both the higher cut performance of shaped abrasive particle as well as the better adhesion, and lower shelling rate, of crushed mineral. In some embodiments, at least 15% of each particle is precision shaped. In some embodiments, at last 30% of each particle is precision shaped. Preferably, 50-95% of each particle by volume is precision shaped.

At least some embodiments described herein show improved shelling resistance compared to conventional precision shaped abrasive particles. At least some embodiments described herein illustrate abrasive articles with more exposed precision shaped abrasive particle for cutting. The presence of the irregular portion helps to ensure correct orientation of the precision shaped abrasive portion of the abrasive particle. Further, because more of the precision shaped abrasive portion is available on the surface, articles incorporating such abrasive particles have a longer use life. Additionally, partially shaped abrasive particles may be easier to coat because the shaped portion of the abrasive particle is more exposed.

FIGS. 1A-1C illustrate examples of partially shaped abrasive particles in accordance with embodiments of the present invention. Partially shaped abrasive particles 100 may be engineered to have a desired shaped portion combined with an irregularly shaped portion, in accordance with different embodiments described herein.

FIG. 1A illustrates one example of a partially shaped abrasive particle in accordance with embodiments described herein. Partially shaped abrasive particle 110 has a shaped portion 112, illustrated as a tetrahedron, and an irregular portion 114.

Partially shaped abrasive particle 120, illustrated in FIG. 1B, is another example of a partially shaped abrasive particle in accordance with embodiments described herein. Partially shaped abrasive particle 120 has a shaped portion 122 and an irregular portion 124. Shaped portion 122 is a shaped abrasive particle with two faces, both triangular, separated by a thickness, t. Each of the two faces illustrated in FIG. 1B is an isosceles triangle.

Partially shaped abrasive particle 130, illustrated in FIG. 1C, is another embodiment. Partially shaped abrasive particle 130 has a shaped portion 132 and an irregular portion 134. Shaped portion 132 is a shaped abrasive particle with two faces, both triangular, separated by a thickness, t. Each of the two faces illustrated in FIG. 1C is a scalene triangle.

FIGS. 1A-1C represent only some examples of potential shapes for shaped abrasive particle portions 112, 122 and 132. For example, while shaped portion 112 illustrates a tetrahedron, other pyramidal structures are also envisioned, including those with bases of 4, 5, or more edges. Additionally, while shaped portion 112 illustrates a tetrahedron with four substantially identical faces, it is also envisioned that other tetrahedron shapes are possible, including those with only two identical faces, three identical faces, or no substantially identical faces.

Additionally, while FIGS. 1B and 1C illustrate some example triangular shaped abrasive portions 122 and 132, it is also envisioned that other polygonal shapes are possible for one or more faces of the shaped portions of the abrasive particles, including polygons with four, five or more sides.

The partially shaped abrasive particles of the present invention each have a shaped portion substantially precisely formed three-dimensional shape. Typically, the shaped portion of each particle generally has a predetermined geometric shape, for example one that substantially replicates a shaped portion of a mold cavity used to form the partially shaped abrasive particle.

Suitable examples for geometric shapes that may form the basis of a three-dimensional shape for the shaped portion of a partially shaped abrasive particle include polygons (including equilateral, equiangular, star-shaped, regular and irregular polygons), lense-shapes, lune-shapes, circular shapes, semicircular shapes, oval shapes, circular sectors, circular segments, drop-shapes and hypocycloids (for example super elliptical shapes).

For the purposes of this invention geometric shapes are also intended to include regular or irregular polygons or stars wherein one or more edges (parts of the perimeter of the face) can be arcuate (either of towards the inside or towards the outside, with the first alternative being preferred). Triangular shapes also include three-sided polygons wherein one or more of the edges (parts of the perimeter of the face) can be arcuate, i.e., the definition of triangular extends to spherical triangles and the definition of quadrilaterals extends to superellipses. A second side may have (and preferably is) a second face. The second face may have a perimeter of a second geometric shape.

Further, while shaped portions 112, 122 and 132 are all illustrated as having smooth faces, it is also contemplated that, in at least some embodiments, partially shaped abrasive particles have shaped portions with additional features. For example, one or more faces of a shaped abrasive portion may have grooves or ridges. In another example, one or more faces may be concave or convex.

Methods for making shaped abrasive particles having at least one sloping sidewall are for example described in US Patent Application Publication No. 2009/0165394. Methods for making shaped abrasive particles having an opening are for example described in US Patent Application Publication No. 2010/0151201 and 2009/0165394. Methods for making shaped abrasive particles having grooves on at least one side are for example described in US Patent Application Publication No. 2010/0146867. Methods for making dish-shaped abrasive particles are for example described in US Patent Application Publication Nos. 2010/0151195 and 2009/0165394. Methods for making shaped abrasive particles with low Roundness Factor are for example described in US Patent Application Publication No. 2010/0319269. Methods for making shaped abrasive particles with at least one fractured surface are for example described in US Patent Application Publication Nos. 2009/0169816 and 2009/0165394. Methods for making abrasive particles wherein the second side has a vertex (for example, dual tapered abrasive particles) or a ridge line (for example, roof shaped particles) are for example described in WO 2011/068714.

Composition of Partially Shaped Abrasive Particles

Partially shaped abrasive particles 100 can be formed from many suitable materials or combinations of materials. For example, partially shaped abrasive particles 100 can be a ceramic material or a polymeric material. If partially shaped abrasive particles 100 are made from a ceramic material, the ceramic material can include alpha alumina, sol-gel derived alpha alumina, or a mixture thereof. Other suitable materials include a fused aluminum oxide, a heat-treated aluminum oxide, a ceramic aluminum oxide, a sintered aluminum oxide, a silicon carbide material, a titanium diboride, a boron carbide, a tungsten carbide, a titanium carbide, a diamond, a cubic boron nitride, a garnet, a fused alumina-zirconia, a cerium oxide, a zirconium oxide, a titanium oxide or a combination thereof. Additionally, as discussed in greater detail below with respect to FIGS. 5-6, it is also expressly contemplated that, in some embodiments, that the shaped portion of the partially shaped abrasive particles 100 are a different material than the irregular portion.

Partially shaped abrasive particles 100 that include a polymeric material can be characterized as soft abrasive particles. The soft shaped abrasive particles described herein can include any suitable material or combination of materials. For example, the soft shaped abrasive particles can include a reaction product of a polymerizable mixture including one or more polymerizable resins. The one or more polymerizable resins are chosen from a phenolic resin, a urea formaldehyde resin, a urethane resin, a melamine resin, an epoxy resin, a bismaleimide resin, a vinyl ether resin, an aminoplast resin (which may include pendant alpha, beta unsaturated carbonyl groups), an acrylate resin, an acrylated isocyanurate resin, an isocyanurate resin, an acrylated urethane resin, an acrylated epoxy resin, an alkyl resin, a polyester resin, a drying oil, or mixtures thereof. The polymerizable mixture can include additional components such as a plasticizer, an acid catalyst, a cross-linker, a surfactant, a mild-abrasive, a pigment, a catalyst and an antibacterial agent.

Where multiple components are present in the polymerizable mixture, those components can account for any suitable weight percentage of the mixture. For example, the polymerizable resin or resins, may be in a range of from about 35 wt % to about 99.9 wt % of the polymerizable mixture, about 40 wt % to about 95 wt %, or less than, equal to, or greater than about 35 wt %, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or about 99.9 wt %.

If present, the cross-linker may be in a range of from about 2 wt % to about 60 wt % of the polymerizable mixture, from about 5 wt % to about 10 wt %, or less than, equal to, or greater than about 2 wt %, 3, 4, 5, 6, 7, 8, 9, 10, 11, 12, 13, 14, or about 15 wt %. Examples of suitable cross-linkers include a cross-linker available under the trade designation CYMEL 303 LF, of Allnex USA Inc., Alpharetta, Ga., USA; or a cross-linker available under the trade designation CYMEL 385, of Allnex USA Inc., Alpharetta, Ga., USA.

If present, the mild-abrasive may be in a range of from about 5 wt % to about 65 wt % of the polymerizable mixture, about 10 wt % to about 20 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or about 65 wt %. Examples of suitable mild-abrasives include a mild-abrasive available under the trade designation MINSTRON 353 TALC, of Imerys Talc America, Inc., Three Forks, Mont., USA; a mild-abrasive available under the trade designation USG TERRA ALBA NO. 1 CALCIUM SULFATE, of USG Corporation, Chicago, Ill., USA; Recycled Glass (40-70 Grit) available from ESCA Industries, Ltd., Hatfield, Pa., USA, silica, calcite, nepheline, syenite, calcium carbonate, or mixtures thereof.

If present, the plasticizer may be in a range of from about 5 wt % to about 40 wt % of the polymerizable mixture, about 10 wt % to about 15 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or about 40 wt %. Examples of suitable plasticizers include acrylic resins or styrene butadiene resins. Examples of acrylic resins include an acrylic resin available under the trade designation RHOPLEX GL-618, of DOW Chemical Company, Midland, Mich., USA; an acrylic resin available under the trade designation HYCAR 2679, of the Lubrizol Corporation, Wickliffe, Ohio, USA; an acrylic resin available under the trade designation HYCAR 26796, of the Lubrizol Corporation, Wickliffe, Ohio, USA; a polyether polyol available under the trade designation ARCOL LG-650, of DOW Chemical Company, Midland, Mich., USA; or an acrylic resin available under the trade designation HYCAR 26315, of the Lubrizol Corporation, Wickliffe, Ohio, USA. An example of a styrene butadiene resin includes a resin available under the trade designation ROVENE 5900, of Mallard Creek Polymers, Inc., Charlotte, N.C., USA.

If present, the acid catalyst may be in a range of from 1 wt % to about 20 wt % of the polymerizable mixture, about 5 wt % to about 10 wt %, or less than, equal to, or greater than about 1 wt %, 2, 3, 4, 5, 6, 7, 8, 9, 10, 11, 12, 13, 14, 15, 16, 17, 18, 19, or about 20 wt %. Examples of suitable acid catalysts include a solution of aluminum chloride or a solution of ammonium chloride.

If present, the surfactant can be in a range of from about 0.001 wt % to about 15 wt % of the polymerizable mixture about 5 wt % to about 10 wt %, less than, equal to, or greater than about 0.001 wt %, 0.01, 0.5, 1, 2, 3, 4, 5, 6, 7, 8, 9, 10, 11, 12, 13, 14, or about 15 wt %. Examples of suitable surfactants include a surfactant available under the trade designation GEMTEX SC-85-P, of Innospec Performance Chemicals, Salisbury, N.C., USA; a surfactant available under the trade designation DYNOL 604, of Air Products and Chemicals, Inc., Allentown, Pa., USA; a surfactant available under the trade designation ACRYSOL RM-8W, of DOW Chemical Company, Midland, Mich., USA; or a surfactant available under the trade designation XIAMETER AFE 1520, of DOW Chemical Company, Midland, Mich., USA.

If present, the antimicrobial agent may be in a range of from 0.5 wt % to about 20 wt % of the polymerizable mixture, about 10 wt % to about 15 wt %, or less than, equal to, or greater than about 0.5 wt %, 1, 2, 3, 4, 5, 6, 7, 8, 9, 10, 11, 12, 13, 14, 15, 16, 17, 18, 19, or about 20 wt %. An example of a suitable antimicrobial agent includes zinc pyrithione.

If present, the pigment may be in a range of from about 0.1 wt % to about 10 wt % of the polymerizable mixture, about 3 wt % to about 5 wt %, less than, equal to, or greater than about 0.1 wt %, 0.2, 0.4, 0.6, 0.8, 1, 1.5, 2, 2.5, 3, 3.5, 4, 4.5, 5, 5.5, 6, 6.5, 7, 7.5, 8, 8.5, 9, 9.5, or about 10 wt %. Examples of suitable pigments include a pigment dispersion available under the trade designation SUNSPERSE BLUE 15, of Sun Chemical Corporation, Parsippany, N.J., USA; a pigment dispersion available under the trade designation SUNSPERSE VIOLET 23, of Sun Chemical Corporation, Parsippany, N.J., USA; a pigment dispersion available under the trade designation SUN BLACK, of Sun Chemical Corporation, Parsippany, N.J., USA; or a pigment dispersion available under the trade designation BLUE PIGMENT B2G, of Clariant Ltd., Charlotte, N.C., USA.

In addition to the materials already described, at least one magnetic material may be included within or coated onto shaped abrasive particles 100. Examples of magnetic materials include iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., $SmCo_5$); MnSb; $MnOFe_2O_3$; $Y_3Fe_5O_{12}$; $CrO_2$; MnAs; ferrites such as ferrite, magnetite; zinc ferrite; nickel ferrite; cobalt ferrite, magnesium ferrite, barium ferrite, and strontium ferrite; yttrium iron garnet; and combinations of the foregoing. In some embodiments, the magnetizable material is an alloy containing 8 to 12 weight percent aluminum, 15 to 26 wt % nickel, 5 to 24 wt % cobalt, up to 6 wt % copper, up to 1% titanium, wherein the balance of material to add up to 100 wt % is iron. In some other embodiments, a magnetizable coating can be deposited on abrasive particles 100 using a vapor deposition technique such as, for example, physical vapor deposition (PVD) including magnetron sputtering. Including these magnetizable materials can allow partially shaped abrasive particles 100 to be responsive a magnetic field. Any of partially shaped abrasive particles 100 can include the same material or include different materials.

However, in some embodiments the partially shaped abrasive particles are free of added magnetizable materials. It may not be necessary to add magnetizable materials in order to ensure proper placement of particles on a backing. The incorporation of an irregular portion in a partially shaped abrasive particle may cause the particle to self-orient by altering its center of gravity such that the irregular shaped portion is facing a backing and the partially shaped portion is facing away for the backing. For example, the incorporation of an irregular portion in a partially shaped abrasive particle causes the center of gravity to be on the irregularly shaped end, which may cause the particle to self-orient, such that the irregular shaped portion is facing a backing, and the partially shaped portion is facing away from the backing.

Methods of Manufacturing Partially Shaped Abrasive Particles

Partially shaped abrasive particles 100 can be formed in many suitable manners for example, partially shaped abrasive particles 100 can be made according to a multi-operation process, such as that discussed, for example, below with respect to FIG. 2. The process can be carried out using any material or precursor dispersion material. Briefly, for embodiments where partially shaped abrasive particles 100 are monolithic ceramic particles, the process can include the operations of making either a seeded or non-seeded precursor dispersion that can be converted into a corresponding (e.g., a boehmite sol-gel that can be converted to alpha alumina); filling one or more mold cavities conforming to the negative image of the partially shaped portion of the abrasive particles 100 with a precursor dispersion; drying the precursor dispersion to form precursor shaped abrasive particle; removing the precursor partially shaped abrasive particles 100 from the mold cavities such that the irregular portion of each particle is formed; calcining the precursor partially shaped abrasive particles 100 to form calcined, precursor partially shaped abrasive particles 100; and then sintering the calcined, precursor partially shaped abrasive particles 100 to form shaped abrasive particles 100. The process will now be described in greater detail in the context of alpha-alumina-containing partially shaped abrasive particles 100. In other embodiments, the mold cavities may be filled with a melamine to form melamine partially shaped abrasive particles. Additionally, other precursor materials may also be used in the context of the method illustrated in FIG. 2 in order to form other suitable partially shaped abrasive particles.

The process can include the operation of providing either a seeded or non-seeded dispersion of a precursor that can be converted into ceramic. In examples where the precursor is seeded, the precursor can be seeded with an oxide of an iron (e.g., FeO). The precursor dispersion can include a liquid that is a volatile component. In one example, the volatile component is water. The dispersion can include a sufficient amount of liquid for the viscosity of the dispersion to be sufficiently low to allow filling mold cavities and replicating the mold surfaces, but not so much liquid as to cause subsequent removal of the liquid from the mold cavity to be prohibitively expensive. In one example, the precursor dispersion includes from 2 percent to 90 percent by weight of the particles that can be converted into ceramic, such as particles of aluminum oxide monohydrate (boehmite), and at least 10 percent by weight, or from 50 percent to 70 percent, or 50 percent to 60 percent, by weight, of the volatile component such as water. Conversely, the precursor dispersion in some embodiments contains from 30 percent to 50 percent, or 40 percent to 50 percent solids by weight.

Figure 2:
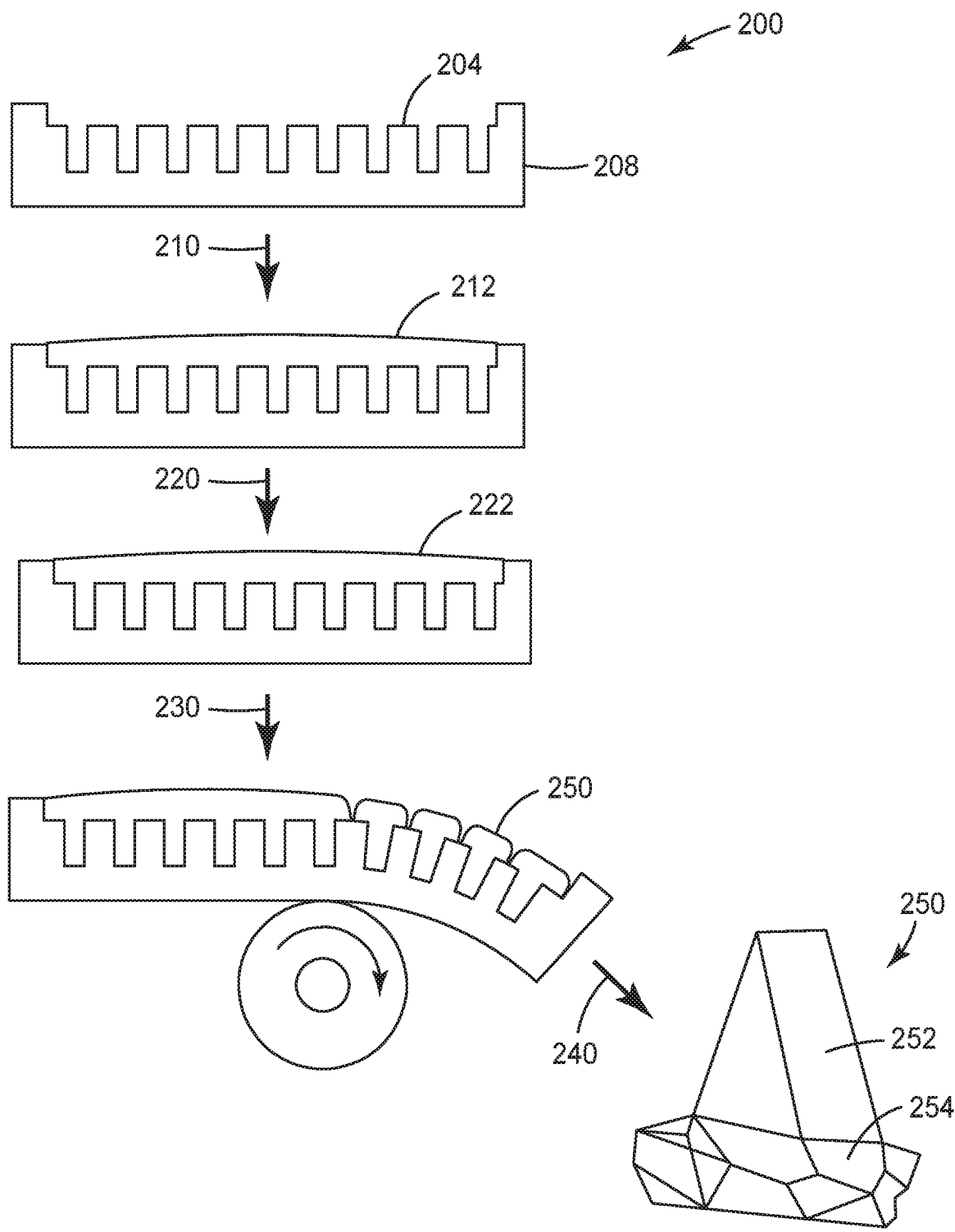
FIG. 2 illustrates one example method of making partially shaped abrasive particles in accordance with an embodiment of the present invention.

FIG. 2 illustrates one example method of making partially shaped abrasive particles in accordance with an embodiment of the present invention. Method 200 may be useful for creating alpha alumina based partially shaped abrasive particles, in one embodiment. However, other materials may also be used.

In step 210, a mold 202 with partially shaped cavities 204 is filled with a precursor slurry 212. As illustrated, precursor slurry 212 substantially completely fills the partially shaped cavities 204. Each of the cavities 204 extending into mold 202 has a shape that will form the basis of the shaped portion of a partially shaped abrasive particle. For example, in the context of the partially shaped abrasive particle 110, the partially shaped cavity 204 would be a tetrahedron, while in the context of the partially shaped abrasive particle 120, the partially shaped cavity 204 would be a triangular prism. However, other shapes are also envisioned for partially shaped cavity 204.

In step 220, the precursor slurry 212 undergoes a drying phase, resulting in a dried agglomerate 222 within mold 202.

The dried agglomerate 220 then undergoes a crushing phase in step 230, resulting in partially shaped abrasive particles 250, which are then removed from mold 202 in step 240.

As illustrated, partially shaped abrasive particles 250 have a shaped portion 252 and an irregular portion 254.

Examples of suitable precursor dispersions include zirconium oxide sols, vanadium oxide sols, cerium oxide sols, aluminum oxide sols, and combinations thereof. Suitable aluminum oxide dispersions include, for example, boehmite dispersions and other aluminum oxide hydrates dispersions. Boehmite can be prepared by known techniques or can be obtained commercially. Examples of commercially available boehmite include products having the trade designations "DISPERAL" and "DISPAL", both available from Sasol North America, Inc., or "HIQ-40" available from BASF Corporation. These aluminum oxide monohydrates are relatively pure; that is, they include relatively little, if any, hydrate phases other than monohydrates, and have a high surface area.

The physical properties of the resulting partially shaped abrasive particles 100 can generally depend upon the type of material used in the precursor dispersion. As used herein, a "gel" is a three-dimensional network of solids dispersed in a liquid.

The precursor dispersion can contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, such as water-soluble salts. They can include a metal-containing compound and can be a precursor of an oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the precursor dispersion can be varied.

The introduction of a modifying additive or precursor of a modifying additive can cause the precursor dispersion to gel. The precursor dispersion can also be induced to gel by application of heat over a period of time to reduce the liquid content in the dispersion through evaporation. The precursor dispersion can also contain a nucleating agent. Nucleating agents suitable for this disclosure can include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina.

A peptizing agent can be added to the precursor dispersion to produce a more stable hydrosol or colloidal precursor dispersion. Suitable peptizing agents are monoprotic acids or acid compounds such as acetic acid, hydrochloric acid, formic acid, and nitric acid. Multiprotic acids can also be used, but they can rapidly gel the precursor dispersion, making it difficult to handle or to introduce additional components. Some commercial sources of boehmite contain an acid titer (such as absorbed formic or nitric acid) that will assist in forming a stable precursor dispersion.

The precursor dispersion can be formed by any suitable means; for example, in the case of a sol-gel alumina precursor, it can be formed by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired.

A further operation can include providing a mold having at least one mold cavity, or a plurality of cavities formed in at least one major surface of the mold. In some examples, the mold is formed as a production tool, which can be, for example, a belt, a sheet, a continuous web, a coating roll such as a rotogravure roll, a sleeve mounted on a coating roll, or a die. In one example, the production tool can include polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one example, the entire tooling is made from a polymeric or thermoplastic material. In another example, the surfaces of the tooling in contact with the precursor dispersion while the precursor dispersion is drying, such as the surfaces of the plurality of cavities, include polymeric or thermoplastic materials, and other portions of the tooling can be made from other materials. A suitable polymeric coating can be applied to a metal tooling to change its surface tension properties, by way of example.

A polymeric or thermoplastic production tool can be replicated off a metal master tool. The master tool can have the inverse pattern of that desired for the production tool. The master tool can be made in the same manner as the production tool. In one example, the master tool is made out of metal (e.g., nickel) and is diamond-turned. In one example, the master tool is at least partially formed using stereolithography. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that can distort the thermoplastic production tool, limiting its life.

Access to cavities can be from an opening in the top surface or bottom surface of the mold. In some examples, the cavities can extend for the entire thickness of the mold. Alternatively, the cavities can extend only for a portion of the thickness of the mold. In one example, the top surface is substantially parallel to the bottom surface of the mold with the cavities having a substantially uniform depth. At least one side of the mold, the side in which the cavities are formed, can remain exposed to the surrounding atmosphere during the step in which the volatile component is removed.

Cavities 204 have a specified three-dimensional shape to make the shaped portion of partially shaped abrasive particles 100. The depth of a given cavity 204 can be uniform or can vary along its length and/or width. The cavities of a given mold can be of the same shape or of different shapes. Additionally, cavities 204 can be spaced closer together or further apart, depending on a desired size of the irregular portion of partially shaped abrasive particles 100. It is to be understood that mold 202 may not be drawn to scale in FIG. 2. Cavities 204 may also have smooth walls or they may have textured walls that impart texture to the shaped portion of the partially shaped abrasive particles 100. Cavities 204 may also be shaped to impart one or more concave or convex faces to the shaped portion of the partially shaped abrasive particles 100.

A further operation involves filling cavities 204 with the precursor dispersion (e.g., by a conventional technique), for example as illustrated in step 210. In some examples, a knife roll coater or vacuum slot die coater can be used. A mold release agent can be used to aid in removing the particles from the mold if desired. Examples of mold release agents include oils such as peanut oil or mineral oil, fish oil, silicones, polytetrafluoroethylene, zinc stearate, and graphite. In general, a mold release agent such as peanut oil, in a liquid, such as water or alcohol, is applied to the surfaces of the production tooling in contact with the precursor dispersion such that from about 0.1 mg/in$^2$ (0.6 mg/cm$^2$) to about 3.0 mg/in$^2$ (20 mg/cm$^2$), or from about 0.1 mg/in$^2$ (0.6 mg/cm$^2$) to about 5.0 mg/in$^2$ (30 mg/cm$^2$), of the mold release agent is present per unit area of the mold when a mold release is desired. In some embodiments, the top surface of the mold is coated with the precursor dispersion. The precursor dispersion can be pumped onto the top surface.

In a further operation, a scraper or leveler bar can be used to force the precursor dispersion fully into cavities 204 of mold 202. The remaining portion of the precursor dispersion that does not enter cavity 204 can be removed from the top surface of mold 202 and recycled. In some examples, a small portion of the precursor dispersion can remain on the top surface, and in other examples the top surface is substantially free of the dispersion. The pressure applied by the scraper or leveler bar can be less than 100 psi (0.6 MPa), or less than 50 psi (0.3 MPa), or even less than 10 psi (60 kPa). In some examples, no exposed surface of the precursor dispersion extends substantially beyond the top surface.

In those examples where it is desired to have the exposed surfaces of the cavities result in planar faces of the shaped abrasive particles, it can be desirable to overfill the cavities (e.g., using a micronozzle array) and slowly dry the precursor dispersion.

A further operation involves removing the volatile component to dry the dispersion. The volatile component can be removed by fast evaporation rates. In some examples, removal of the volatile component by evaporation occurs at temperatures above the boiling point of the volatile component. An upper limit to the drying temperature often depends on the material the mold is made from. For polypropylene tooling, the temperature should be less than the melting point of the plastic. In one example, for a water dispersion of from about 40 to 50 percent solids and a polypropylene mold, the drying temperatures can be from about 90° C. to about 165° C., or from about 105° C. to about 150° C., or from about 105° C. to about 120° C. Higher temperatures can lead to improved production speeds but can also lead to degradation of the polypropylene tooling, limiting its useful life as a mold.

During drying, the precursor dispersion shrinks, often causing retraction from the cavity walls. For example, if the cavities have planar walls, then the resulting partially shaped abrasive particles 100 can tend to have at least three concave major sides. It is presently discovered that by making the cavity walls concave (whereby the cavity volume is increased) it is possible to obtain partially shaped abrasive particles 100 that have at least three substantially planar major sides. The degree of concavity generally depends on the solids content of the precursor dispersion.

A further operation involves removing resultant precursor partially shaped abrasive particles 100 from cavities 204. The precursor partially shaped abrasive particles 100 can be removed from cavities 204 by using the following processes alone or in combination on mold 202: gravity, vibration, ultrasonic vibration, vacuum, or pressurized air to remove particles 100 from cavities 204.

The precursor partially shaped abrasive particles 100 can be further dried outside of mold 202. If the precursor dispersion is dried to the desired level in mold 202, this additional drying step is not necessary. However, in some instances it can be economical to employ this additional drying step to minimize the time that the precursor dispersion resides in mold 202. The precursor partially shaped abrasive particles 100 will be dried from 10 to 480 minutes, or from 120 to 400 minutes, at a temperature from 50° C. to 160° C., or 120° C. to 150° C.

A further operation involves calcining the precursor partially shaped abrasive particles 100. During calcining, essentially all the volatile material is removed, and the various components that were present in the precursor dispersion are transformed into metal oxides. The precursor partially shaped abrasive particles 100 are generally heated to a temperature from 400° C. to 800° C. and maintained within this temperature range until the free water and over 90 percent by weight of any bound volatile material are removed. In an optional step, it can be desirable to introduce the modifying additive by an impregnation process. A water-soluble salt can be introduced by impregnation into the pores of the calcined, precursor partially shaped abrasive particles 100. Then the precursor partially shaped abrasive particles 100 are pre-fired again.

A further operation can involve sintering the calcined, precursor partially shaped abrasive particles 100 to form partially shaped particles 100. In some examples where the precursor includes rare earth metals, however, sintering may not be necessary. Prior to sintering, the calcined, precursor partially shaped abrasive particles 100 are not completely densified and thus lack the desired hardness to be used as partially shaped abrasive particles 100. Sintering takes place by heating the calcined, precursor partially shaped abrasive particles 100 to a temperature of from 1000° C. to 1650° C. The length of time for which the calcined, precursor shaped abrasive particles 100 can be exposed to the sintering temperature to achieve this level of conversion depends upon various factors, but from five seconds to 48 hours is possible.

In another embodiment, the duration of the sintering step ranges from one minute to 90 minutes. After sintering, the shaped abrasive particle 14 can have a Vickers hardness of 10 GPa (gigaPascals), 16 GPa, 18 GPa, 20 GPa, or greater.

Additional operations can be used to modify the described process, such as, for example, rapidly heating the material from the calcining temperature to the sintering temperature, and centrifuging the precursor dispersion to remove sludge and/or waste. Moreover, the process can be modified by combining two or more of the process steps if desired.

To form soft partially shaped abrasive particles 100 the polymerizable mixtures described herein can be deposited in a cavity. The cavity can have a shape corresponding to the negative impression of the desired partially shaped abrasive particles 100. After the cavity is filled to the desired degree, the polymerizable mixture is cured therein. Curing can occur at room temperature (e.g., about 25° C.) or at any temperature above room temperature. Curing can also be accomplished by exposing the polymerizable mixture to a source of electromagnetic radiation or ultraviolet radiation.

Partially shaped abrasive particles 100 can be independently sized according to an abrasives industry recognized specified nominal grade. Abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F18, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Abrasive Articles Containing Partially Shaped Abrasive Particles

According to various embodiments of the present disclosure, an abrasive article is disclosed. The abrasive article can be chosen from many different abrasive articles such as an abrasive belt, an abrasive sheet or an abrasive disc. The abrasive article may be a coated abrasive article, in one embodiment, where the partially shaped abrasive particles are applied to a backing and secured in place with one or more coating layers.

Shaped abrasive particles 100 can account for 100 wt % of the abrasive particles in any abrasive article. Alternatively, shaped abrasive particles 100 can be part of a blend of abrasive particles distributed on a backing. If present as part of a blend, shaped abrasive particles 100 may be in a range of from about 5 wt % to about 95 wt % of the blend, about 10 wt % to about 80 wt %, about 30 wt % to about 50 wt %, or less than, equal to, or greater than about, 5 wt %, 10, 15, 20, 25, 30, 35, 40, 45, 50, 55, 60, 65, 70, 75, 80, 85, 90, or about 95 wt %, of the blend. In the blend, the balance of the abrasive particles may include conventional crushed abrasive particles. Crushed abrasive particles are generally formed through a mechanical crushing operation and have no replicated shape. The balance of the abrasive particles can also include other shaped abrasive particles.

Figure 3:
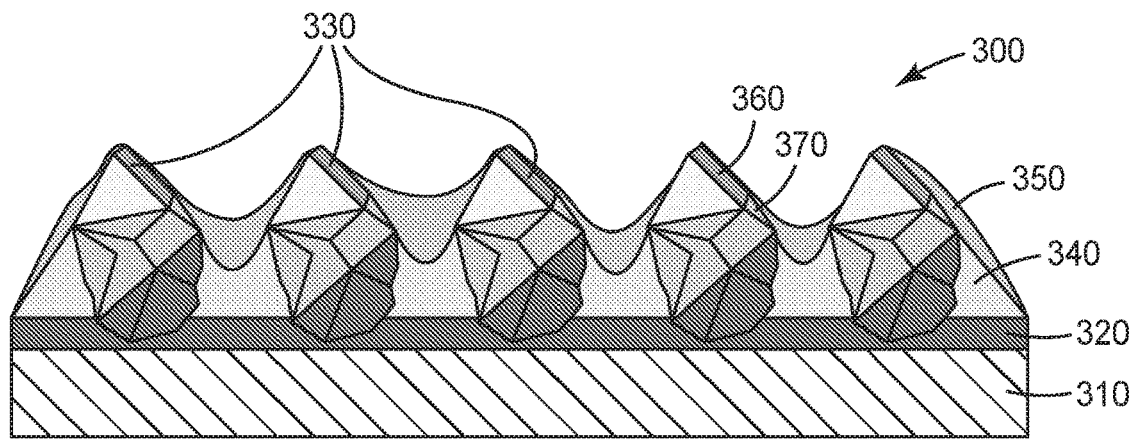
FIG. 3 illustrates one example article incorporating partially shaped abrasive particles in accordance with an embodiment of the present invention.

FIG. 3 illustrates one example article incorporating partially shaped abrasive particles in accordance with an embodiment of the present invention. Coated abrasive article 300 is presented as one example of an abrasive article incorporating partially shaped abrasive particles 330, in accordance with one embodiment of the present invention. However, other forms of abrasive articles are also expressly contemplated. For example, in some embodiments, shaped abrasive particles 100 can be included in a random orbital sander or vibratory sander.

Abrasive article 300 has a backing 310, in one embodiment, to which a first layer of binding material, such as make coat 320, is applied. Partially shaped abrasive particles 330 are placed on backing 310 such that they attach or partially embed within make coat 320. It is desired that substantially all, or at least most of partially shaped abrasive particles 330 are positioned within the make coat such that irregular portion 370 faces backing 310, and shaped portion 360 faces away from backing 310. This can increase the cut of the abrasive article 300 as compared to a corresponding abrasive article with fewer or no partially shaped particles with the shaped portion oriented away from the backing.

Backing 310 can be flexible or rigid. Examples of suitable materials for forming a flexible backing include a polymeric film, a metal foil, a woven fabric, a knitted fabric, paper, vulcanized fiber, a staple fiber, a continuous fiber, a nonwoven, a foam, a screen, a laminate, and combinations thereof. Backing 310 can further include various additive(s). Examples of suitable additives include colorants, processing aids, reinforcing fibers, heat stabilizers, UV stabilizers, and antioxidants. Examples of useful fillers include clays, calcium carbonate, glass beads, talc, clays, mica, wood flour; and carbon black.

Backing 300 can be shaped to allow the coated abrasive article 300 to be in the form of sheets, discs, belts, pads, or rolls. In some embodiments, backing 310 can be sufficiently flexible to allow abrasive article 300 to be formed into a loop to make an abrasive belt that can be run on suitable grinding equipment.

Any abrasive article 300 can include a make coat 320 to adhere partially shaped abrasive particles 100, or a blend of partially shaped abrasive particles 100 and crushed abrasive particles to backing 310. Abrasive article 300 may further include a size coat 340 adhering the shaped abrasive particles to make coat 320. Make coat 320 secures partially shaped abrasive particles 330 to backing 310. Size coat 340 can help to reinforce partially shaped abrasive particles 330.

Make coat 320, size coat 340, or both can include a resinous adhesive. The resinous adhesive any suitable resin such as a phenolic resin, an epoxy resin, a urea-formaldehyde resin, an acrylate resin, an aminoplast resin, a melamine resin, an acrylated epoxy resin, a urethane resin, or mixtures thereof. Additionally, make coat 320, size coat 340, or both can include a filler, a grinding aid, a wetting agent, a surfactant, a dye, a pigment, a coupling agent, an adhesion promoter, or a mixture thereof. Examples of fillers may include calcium carbonate, silica, talc, clay, calcium metasilicate, dolomite, aluminum sulfate, or a mixture thereof. In addition to the resinous adhesive, the make coat 44 or size coat 46, or both coats, may further comprise additives that are known in the art, such as, for example, fillers, grinding aids, wetting agents, surfactants, dyes, pigments, coupling agents, adhesion promoters, and combinations thereof. Examples of fillers include calcium carbonate, silica, talc, clay, calcium metasilicate, dolomite, aluminum sulfate and combinations thereof.

A grinding aid can be applied to the coated abrasive article. A grinding aid is defined as particulate material, the addition of which has a significant effect on the chemical and physical processes of abrading, thereby resulting in improved performance. Grinding aids encompass a wide variety of different materials and can be inorganic or organic. Examples of chemical groups of grinding aids include waxes, organic halide compounds, halide salts, and metals and their alloys. The organic halide compounds will typically break down during abrading and release a halogen acid or a gaseous halide compound. Examples of such materials include chlorinated waxes, such as tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include tin, lead, bismuth, cobalt, antimony, cadmium, iron, and titanium. Other grinding aids include sulfur, organic sulfur compounds, graphite, and metallic sulfides. It is also within the scope of this invention to use a combination of different grinding aids; in some instances, this may produce a synergistic effect. In one embodiment, the grinding aid was cryolite or potassium tetrafluoroborate. The amount of such additives can be adjusted to give desired properties. It is also within the scope of this invention to utilize a supersize coating 350. The supersize coating typically contains a binder and a grinding aid. The binders can be formed from such materials as phenolic resins, acrylate resins, epoxy resins, urea-formaldehyde resins, melamine resins, urethane resins, and combinations thereof.

If present, size coat 340 may then at least partially cured at a second curing station, optionally with further curing of the at least partially cured make layer precursor. In some embodiments, a supersize layer (not shown in FIG. 3) is disposed on the at least partially cured size layer precursor.

While FIG. 3 illustrates triangular prism-shaped partially shaped abrasive particles 330, this is intended as an example only. Other shapes are also expressly contemplated, including other polygonal shapes, partially-shaped abrasive particles with convex or concave faces, and/or partially-shaped abrasive particles with sloping sidewalls. Other constructions are also expressly contemplated.

Additionally, while FIG. 3 illustrates a coated abrasive article 300, partially shaped abrasive particles 330 may also be used in the manufacturing of other abrasive articles, for example in nonwoven or bonded abrasive articles. However, it is noted that partially shaped abrasive particles 330, as discussed above with respect to partially shaped abrasive particles 100, provide surprising benefits when used as part of coated abrasive article 300.

Figure 4A:
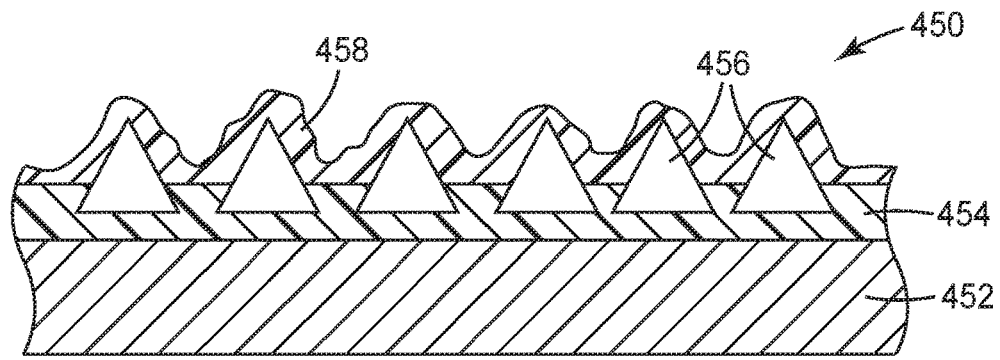
FIGS. 4A-4B illustrate a prior art abrasive article compared with an example abrasive article according to an embodiment of the present invention.
Figure 4B:
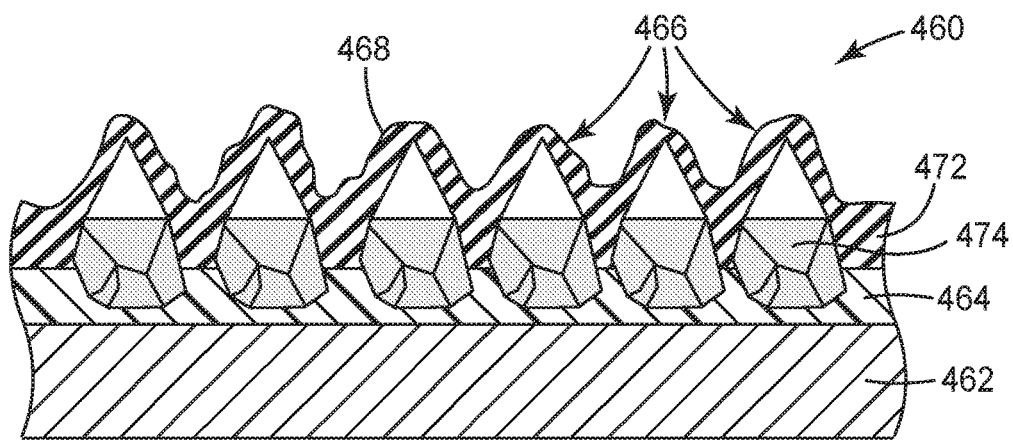

FIGS. 4A-4B illustrate a prior art abrasive article compared with an example abrasive article according to an embodiment of the present invention. The benefits of partially shaped abrasive particles 456 can be seen in the comparison between prior art abrasive article 450 and abrasive article 460.

FIG. 4A illustrates an abrasive article 450 made with the shaped abrasive particles 456 described in U.S. Pat. No. 5,366,523. Shaped abrasive particles 456 are embedded within make coat 454 on backing 452. A size coat 458 is optionally applied over shaped abrasive particles 456.

FIG. 4B illustrates an abrasive article 460 made using the partially shaped abrasive particles 456, which may be similar to partially shaped abrasive articles 330, and/or similar to partially shaped abrasive articles 100, and may be made in a similar manner as that discussed with respect to method 200. Triangular shaped portions 472 are illustrated for easy comparison with the shaped abrasive particles 456. However, it is expressly contemplated that other shapes are possible for shaped portions 472, including, but not limited to, other polygonal shapes with or without surface features such as grooves, convex or concave faces.

Partially shaped abrasive particles 456 provide some benefits from both partially shaped portion 472 and irregular portion 474. Irregular portion 474 increase resistance of partially shaped abrasive particle 456 to shelling. It is hypothesized that the increased resistance is due, at least in part, to the embedding of irregular portion 474 within make coat 464 and size coat 468. The rough surface of irregular portion 474 provides multiple locking sites, keeping partially shaped abrasive particle firmly in place during a grinding application.

Additionally, shaped portion 472 provides benefits over conventional crushed abrasives at least in part because of the shaped cutting edges. However, as illustrated in the comparison of FIG. 4B with FIG. 4A, partially shaped abrasive particles also provide a longer use life of an abrasive article 460 as compared to abrasive article 450 because more of shaped portion 472 is available above make coat 464 as compared with particles 456 of the prior art.

Further, partially shaped abrasive particles provide cost savings and ease manufacturing of abrasive article 460 compared to abrasive article 450. The inclusion of irregular portion 474 may allow for easier orientation of partially shaped abrasive particles 460, such that shaped portions 472 are oriented facing away from backing 462, without the need for additional precision placement techniques. In contrast, shaped abrasive particles 456 are susceptible to poor placement, for example with a face being placed parallel to the backing 452 instead of perpendicular. In contrast, the presence of irregular portion 474 may ensure that more partially shaped abrasive particles 456 are placed with shaped portion 472 facing outward as indicated in FIG. 4B. Additional cost savings from embodiments described herein may come from the ability to coat partially shaped abrasive particles 456 more easily because more of the shaped portion 472 is exposed.

According to various embodiments, a method of using an abrasive article, such as article 300 or 460 includes contacting partially shaped abrasive particles, such as particles 100, 330 or 460, with a workpiece or substrate. The workpiece or substrate can include many different materials such as steel, steel alloy, aluminum, plastic, wood, or a combination thereof. Upon contact, one of the abrasive article and the workpiece is moved relative to one another and a portion of the workpiece is removed.

Figure 5A:
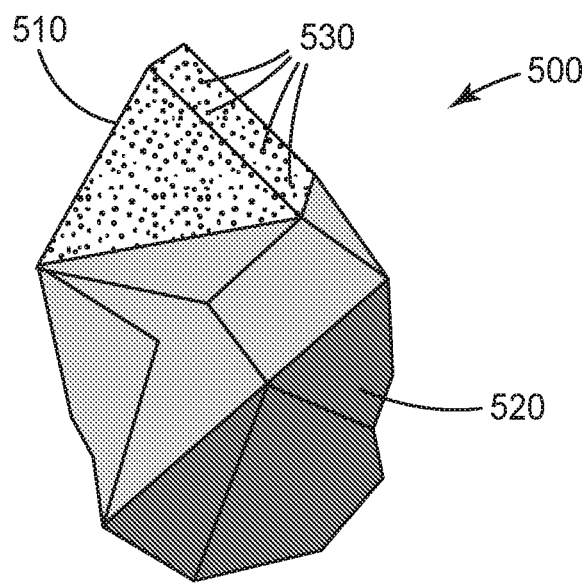
FIGS. 5A-5D illustrate another example partially shaped abrasive particle in accordance with another embodiment of the present invention
Figure 5B:
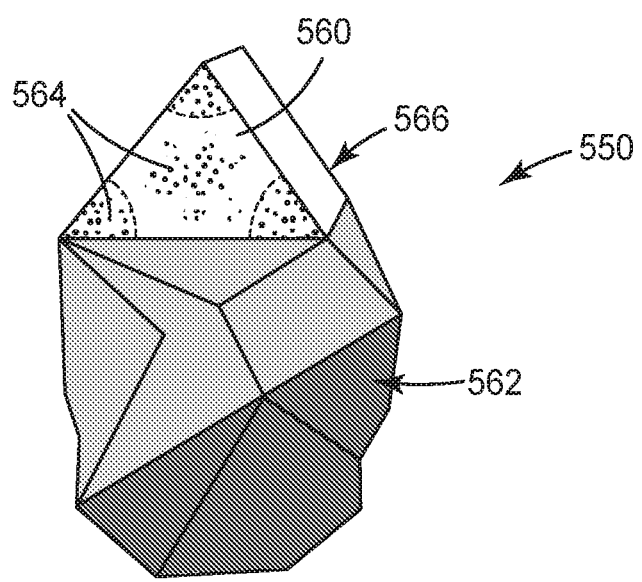

FIGS. 5A-5B illustrate another example partially shaped abrasive particle in accordance with another embodiment of the present invention. While discussion thus far has contemplated a partially shaped abrasive particle composed of a single material. However, it is expressly contemplated that a partially shaped abrasive particle may be made of multiple materials, for example such that the shaped portion is a different material from the irregular potion. FIGS. 5A-5B illustrate an example of a partially shaped abrasive particle with different compositions.

FIG. 5A illustrates a partially shaped abrasive particle 500 with a shaped portion 510 comprising zirconia alumina ($ZrO_2$) precipitates 530 (not necessarily shown to scale). Methods of manufacturing zirconia-reinforced abrasive particles can be found in U.S. Pat. No. 9,212,302. Zirconia particles 530 may enhance the abrasive behavior of partially shaped abrasive particle 500. An abrasive article incorporating such particles may have better grinding properties.

In one embodiment, the zirconia content is at least about 0.05% by weight. In one embodiment the zirconia content is less than or equal to about 40% by weight. In one embodiment the zirconia content is at about 0.1, 0.2, 0.3, 0.4, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40% $ZrO_2$ by weight. Irregular portion 520 may also contain zirconia alumina precipitates 530, in one embodiment. In another embodiment, as shown in FIG. 5A, irregular portion 520 is substantially free of zirconia alumina precipitates.

FIG. 5B illustrates a partially shaped abrasive particle 550 with a shaped portion 560 comprising zirconia alumina precipitates (not necessarily shown to scale). FIG. 5B shows an embodiment where multiple sizes of zirconia particles 564 are present. Those illustrated as in the center region of shaped portion 560 may be useful for general breaking strength of the abrasive particle. The zirconia precipitates 566, located within the corner regions of portion 560 enhance the abrasive behavior of the particle. Irregular portion 562 may also contain zirconia alumina precipitates 564, in one embodiment. In another embodiment, as shown in FIG. 5B, irregular portion 562 is substantially free of zirconia alumina precipitates.

Figure 5C:
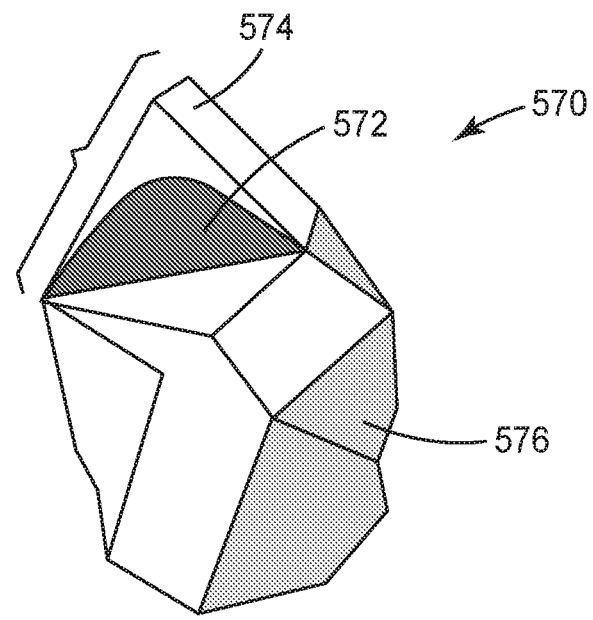

FIG. 5C illustrates a partially shaped abrasive particle 570 with a shaped portion 575 and an irregular portion 576. Shaped portion 575 comprise two discrete phases of material, for example an alpha alumina phase 572 and a zirconia alumina phase 574. The two phases 572 and 574 may be formed in a single process, for example by first applying a zirconia alumina precursor material to a mold and then applying an alpha alumina precursor material to the mold, prior to applying the precursor material for irregular portion 576. Irregular portion 576 may be either alpha alumina or zirconia alumina, or another material.

Figure 5D:
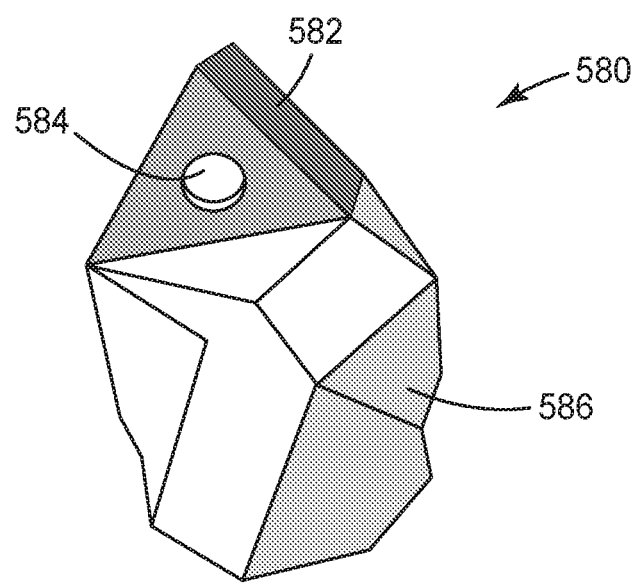

FIG. 5D illustrates a partially shaped abrasive particle 580 with a shaped portion 582 with an opening 584, and an irregular portion 582. Shaped abrasive particles with openings, as well as methods of manufacture, are described in U.S. Pat. No. 8,142,532, which is herein incorporated by reference.

Figure 6:
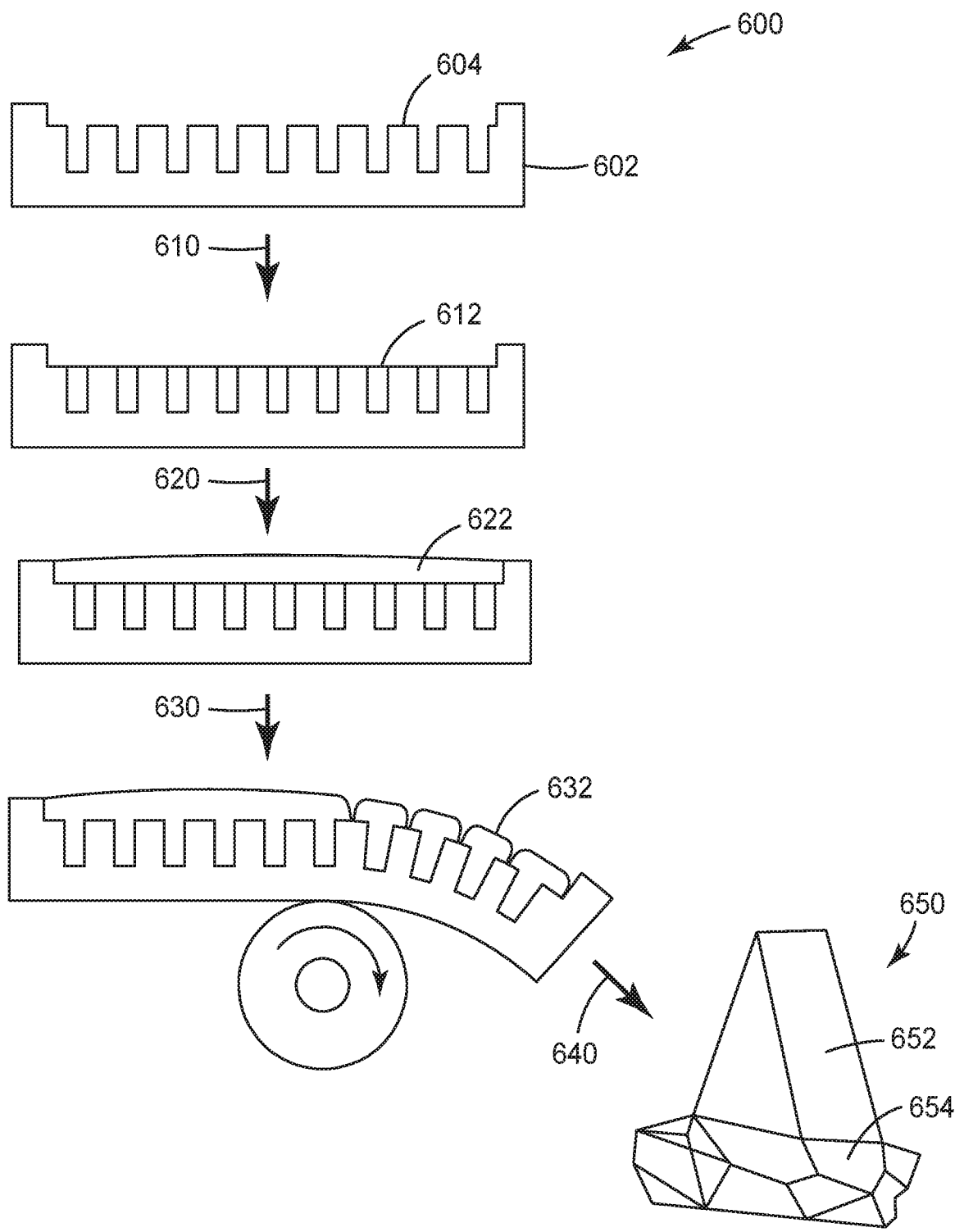
FIG. 6 illustrates another example method of making partially shaped abrasive particles in accordance with another embodiment of the present invention.

FIG. 6 illustrates another example method of making partially shaped abrasive particles in accordance with another embodiment of the present invention. Method 600 may be useful for preparing partially shaped abrasive particles 650 where shaped portion 652 differs in composition from irregular portion 654. Method 600 is similar to method 200, described above. Where appropriate, and for the sake of brevity, similar details laid out with respect to method 200 are considered applicable to method 600 as well.

A mold 602 with a plurality of partially shaped cavities 604 is filled with an alumina zirconia precursor slurry 612, in step 610. As illustrated, alumina zirconia precursor slurry 610 may be added to fill the cavities of tool 602. In step 620, an additional precursor slurry, an alumina precursor slurry 622 is added to fill the remainder of partially shaped cavities 604. In step 630, precursor particles are separated from each other. In step 640, partially shaped abrasive particles 650 are removed from the tool.

Method 600 differs from method 200 namely in step 620, the addition of a second precursor slurry. However, while method 600 is described in the context of two precursor slurries, 612 with zirconia and 622 without, it is also expressly contemplated that, in some embodiments, both precursor slurries contain some concentration of zirconia, with precursor 612 containing a higher concentration than 622.

Method of Using an Abrasive Article Containing Partially Shaped Abrasive Particles In addition, the present invention relates to a method for abrading a workpiece, the method comprising frictionally contacting at least a portion of an abrasive article according to the invention with a surface of a workplace; and moving at least one of the workpiece or the abrasive article (while in contact) to abrade at least a portion of the surface of the workpiece.

EXAMPLES

Various embodiments of the present disclosure can be better understood by reference to the following Examples which are offered by way of illustration. The present disclosure is not limited to the Examples given herein.

FIGS. 7-10 illustrate examples of manufactured partially shaped abrasive particles made according to the examples below.

Unless otherwise noted, all parts, percentages, ratios, etc. in the Examples and the rest of the specification are by weight. Unless stated otherwise, all other reagents were obtained, or are available from fine chemical vendors such as Sigma-Aldrich Company, St. Louis, Mo., or may be synthesized by known methods.

Unit Abbreviations Used in the Examples:
° C.: degree Celsius
cm: centimeter
IN: inch
g: gram
g/m2: grams per square meter
rpm: revolutions per minute
mm: millimeter
wt. %: weight percent.

Materials used in the Examples are described in Table 1:

TABLE 1

| ABBREVIATION | DESCRIPTION |
| --- | --- |
| PSAP | Partially shaped abrasive particles (PSAP) disclosed in this application. |
| Mold | The making process involves providing a mold having at least one precision shaped mold cavity, and preferably a plurality of precision shaped mold cavities. The mold can have a generally planar bottom surface and a plurality of mold cavities. The plurality of precision shaped mold cavities can be formed in a production tool. The production tool can be a belt, a sheet, a continuous web, a coating roll such as a rotogravure roll, a sleeve mounted on a coating roll, or die. The cavity has a specified three-dimensional shape. In one embodiment, the shape of a cavity can be described as being a triangle. Alternatively, other cavity shapes can be used, such as, rectangles, squares, hexagons, stars, or combinations thereof. The production tool described in WO application 2015/100018 and U.S. Pat. No. 9,776,302 were used in all examples. |
| RA | Mold releasing agent. In many embodiments, a mold release agent may include in the precursor pre-mix or coat onto the mold surface as disclosed in WO2014/070468A1 (Rosenflanz, et al), to aid in removing the shaped abrasive precursor particles from the substrate, if desired. Typical mold release agents include oils such as peanut oil or mineral oil, fish oil, silicones, polytetrafluoroethylene (ptfe), zinc stearate, and graphite. In general, a mold release agent such as peanut oil, in a liquid, such as water or alcohol, is applied to the surfaces of the production tooling in contact with the slurry such that between about 0.1 mg/in2 (0.6 mg/cm2) to about 3.0 mg/in2 (20 mg/cm2), or between about 0.1 mg/in2 (0.6 mg/cm2) to about 5.0 mg/in2 (30 mg/cm2) of the mold release agent is present when a mold release is desired. Unless otherwise noted, the release agent solution is 0.2% peanut oil in methanol by weight. |
| Sol-Gel Precursor pre-Mix | In general, Sol-Gel Precursor pre-Mix is a dispersion comprising water, colloid alumina source, and optionally peptizing agent (e.g., an acid such as nitric acid) as described in U.S. Pat. No. 6,287,353. An example of precursor sol-gel mixture was made using the following recipe: aluminum oxide monohydrate powder (1600 parts) having the trade designation "DISPERAL' (Sasol Chemicals North America LLC, Houston, Texas) was dispersed by high shear mixing a solution containing water (2400 parts) and 70% aqueous nitric acid (72 parts) for 11 minutes. The resulting Sol-gel precursor was aged for at least 1 hour before use. |
| Doped Sol-Gel Precursor pre-Mix | A modified Sol-Gel Precursor pre-Mix containing 0.2-10% magnesia, titania, zirconia, yttria, and rare earth metal oxides or precursors can be converted to magnesia, titania, zirconia, yttria, and rare earth metal oxides. An example of zirconia is zirconium oxide aqueous dispersion with 18% solid purchased from Alfa Aesar ® (Ward Hill, MA). An example of zirconia precursor is Zirconium dichloride oxide hydrate (99.9% purity) from purchased from Alfa Aesar ® (Ward Hill, MA). |
| Slurry Precursor Pre-Mix | In general, Slurry Precursor Pre-Mix is a dispersion comprising water, non-colloidal alumina powder source, and optionally stabilizing agent and temporary binder, as described in U.S. patent application Ser. No. 2015/0,267,097 A1. An example of precursor slurry was made using the following recipe: A polyethylene-lined ball-mill jar was charged with 100 grams (g) of deionized water, 0.5 g of ammonium citrate dispersant agent, and 400 g of aluminum oxide powder (product ID: SPA-0.5, with Alumina oxide purity of 99.995%) from Sasol North America, Inc Sasol North America Inc., Tucson, Arizona as CERALOX. About 700 grams of alumina milling media (10 mm diameter; 99.9% alumina; obtained from Union Process, Akron, Ohio) were added to the bottle, and the mixture was milled at 120 rpm for 24 hours. After milling, the milling media was removed and the slurry was degassed by placing it into a desiccator jar and applying a vacuum using mechanical pump (about 10 minutes hold under vacuum). |
| SEM | Scanning Electron Microscope, JSM-7610F, JEOL Ltd. (Japan) |
| Keyence | Optical microscope, VK-5000 made by Keyence Corporation (USA) |

Example 1

Figure 7:
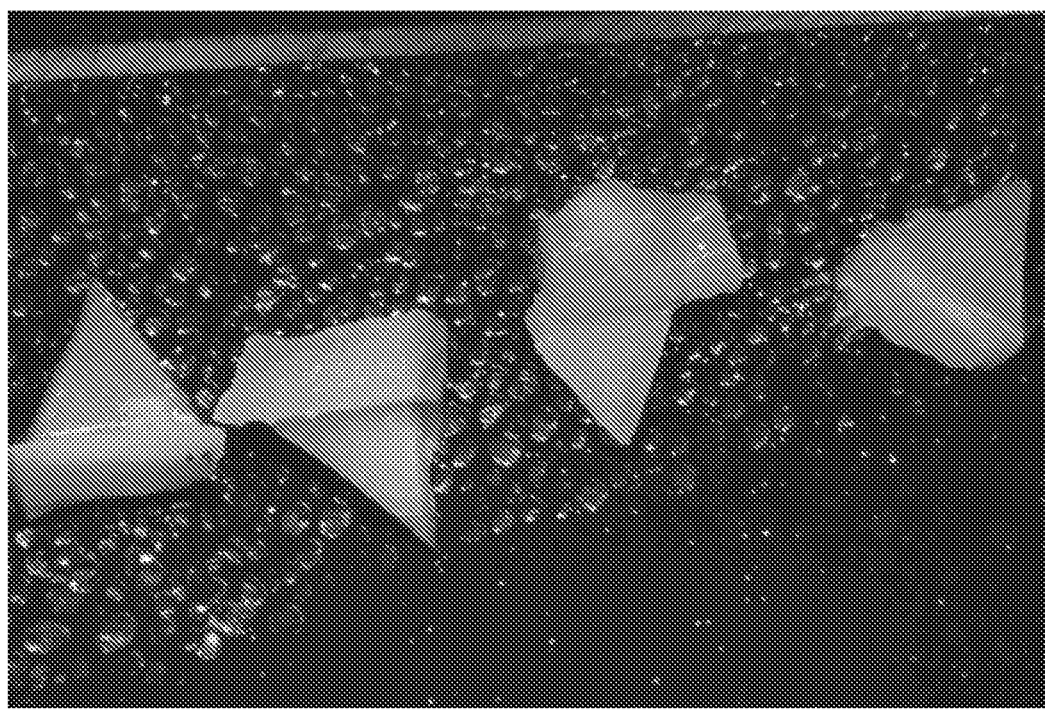

A piece of production tool (9×11 inches) was pre-treated with a RA solution with a brush and then dried at 50 degrees Celsius for 10 minutes before use. The Sol-Gel Precursor pre-Mix was spread into the mold cavities with putty knife to completely fill the shaped cavities of the tool to form the shaped portion of the particle. Sol-Gel Precursor pre-Mix was then spread onto the surface of shaped portion evenly to form the base layer of the partially shaped particles. The thickness ration of shaped portion to irregular base portion is about 2:1. The tool together with the Sol-Gel Precursor were dried at 75 degrees Celsius under the relative humidity lower than 15% for 5 minutes. As the base portion dries faster than that of the shaped portion and gel volume shrinks during drying process, the base portion gel fractured into small pieces. The production tool together with the dried or partially dried gel was then passed over a 0.5 cm diameter rod to crank the base portion. The partially shaped precursor particles were released from the tool with the aid of sonication vibration, resulting in the partially shaped precursor particles illustrated in FIG. 7. FIG. 7 is an image of partially shaped abrasive particles, the image taken with a Z20:X30 lens. The partially shaped precursor particles can be further converted to abrasive particles with the firing and sintering process described in U.S. Pat. No. 8,142,531.

Example 2

A second partially shaped abrasive grain was formed using the same procedure as Example-1, with the exception that the shaped portion of the particle was made with the Doped Sol-Gel Precursor pre-Mix containing 2% zirconia and the base portion was made with the Sol-Gel Precursor pre-Mix.

Figure 8:
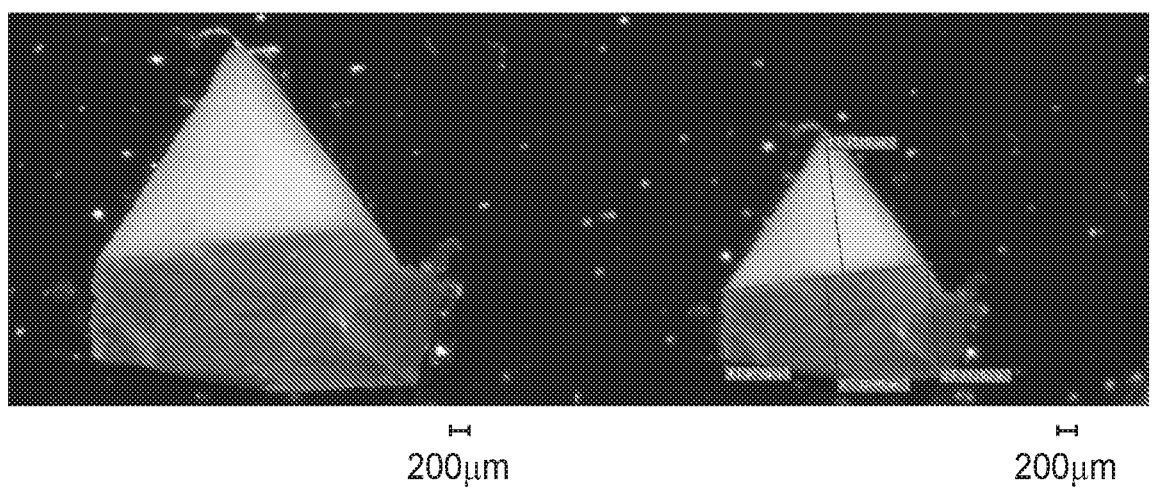

FIG. 8 presents an optical image of the partially shaped precursor particles made in Example 2. As illustrated in FIG. 8, particles 500 or 550 contain an alumina-zirconia blend and the irregular portion is alumina with substantially no zirconia.

FIG. 9 presents the optical images of the partially shaped precursor particles before (FIG. 9A) and after fractured to individual particles (FIG. 9B). The shaped portion includes zirconia and the irregular portion is alumina with little or no zirconia present.

Figure 10A:
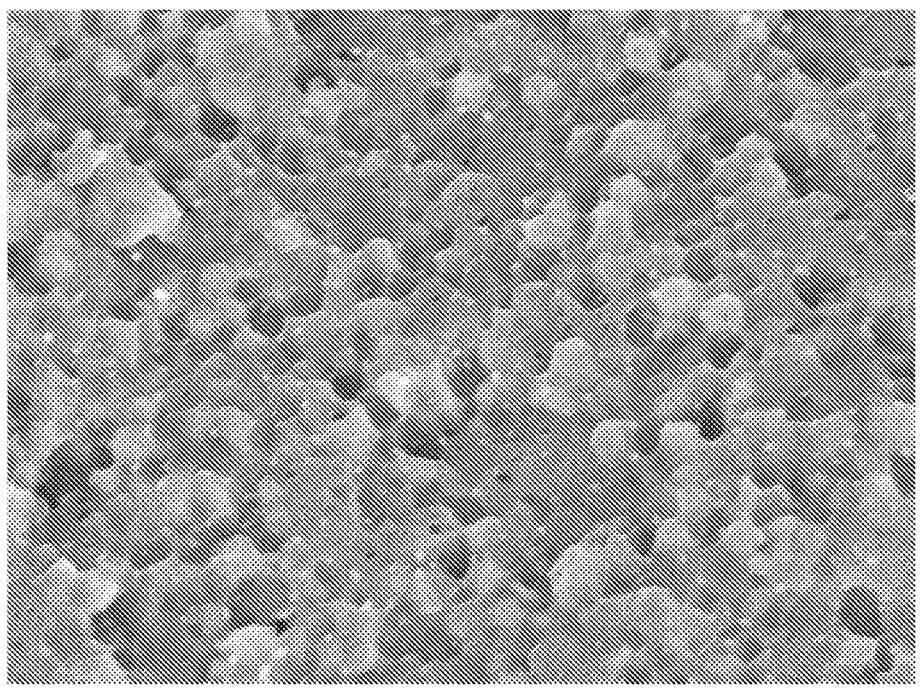
Figure 10B:
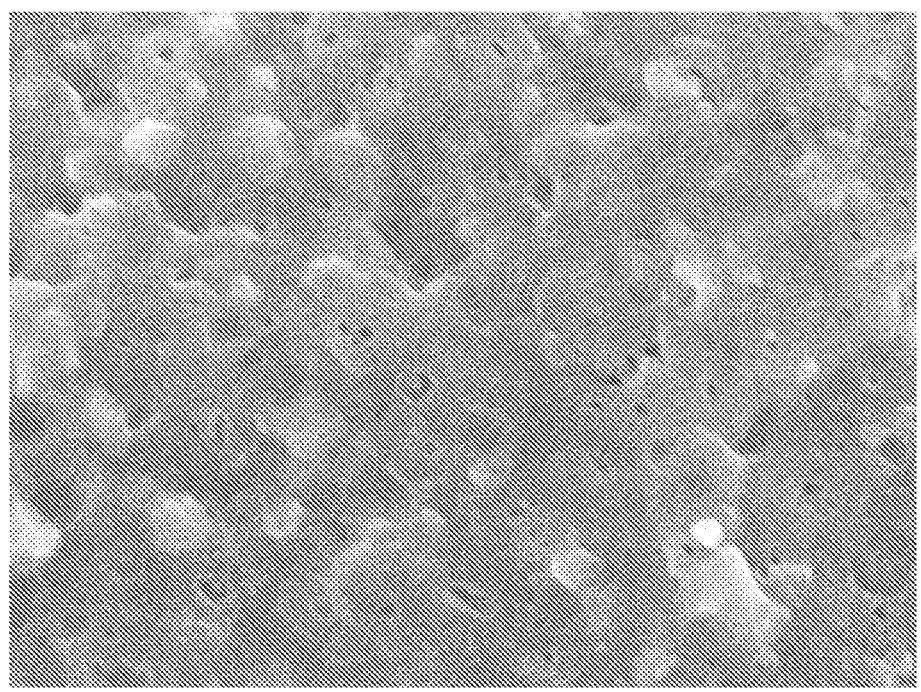

FIG. 10 presents the SEM images taken from the shaped portion with Zirconia presence (FIG. 10A) and the irregular base portion with no Zirconia presence (FIG. 10B). FIG. 10A shows the microstructure 1000 of a shaped portion of a partially shaped abrasive particle. Zirconia nanoparticles 1010 are visible at the scale shown. FIG. 10B illustrates a microstructure 1050 of the irregular portion of the partially shaped abrasive particle.

Example 3

A third partially shaped abrasive grain was formed using the same procedure as Example-1, with the exception that the shaped portion of the particle was made with the Slurry Precursor Pre-Mix.

Figure 11A:
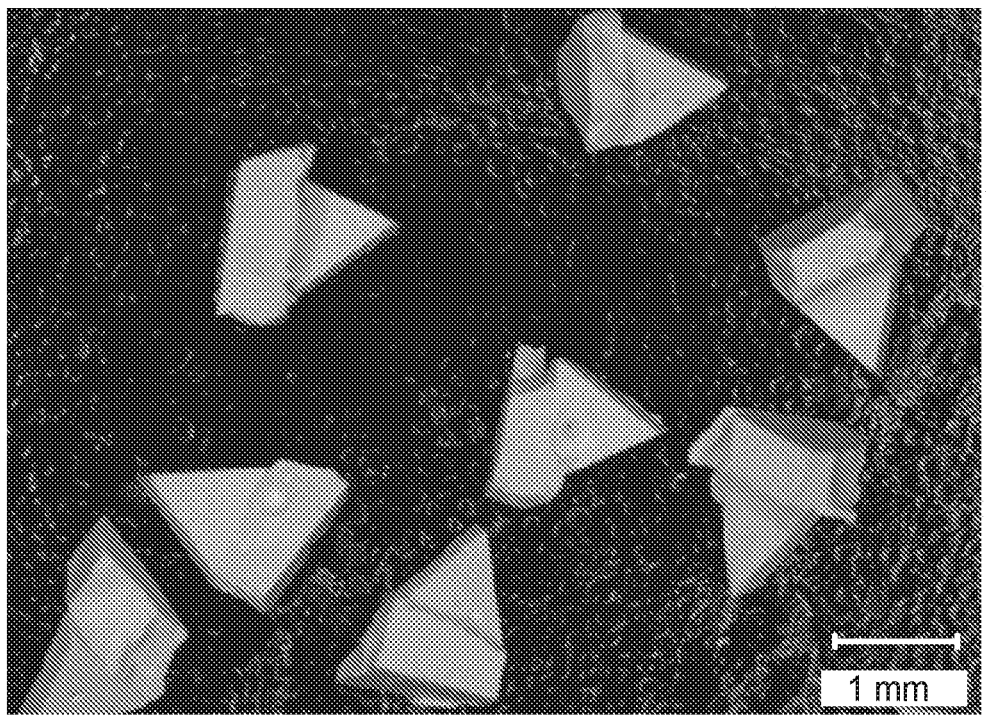
Figure 11B:
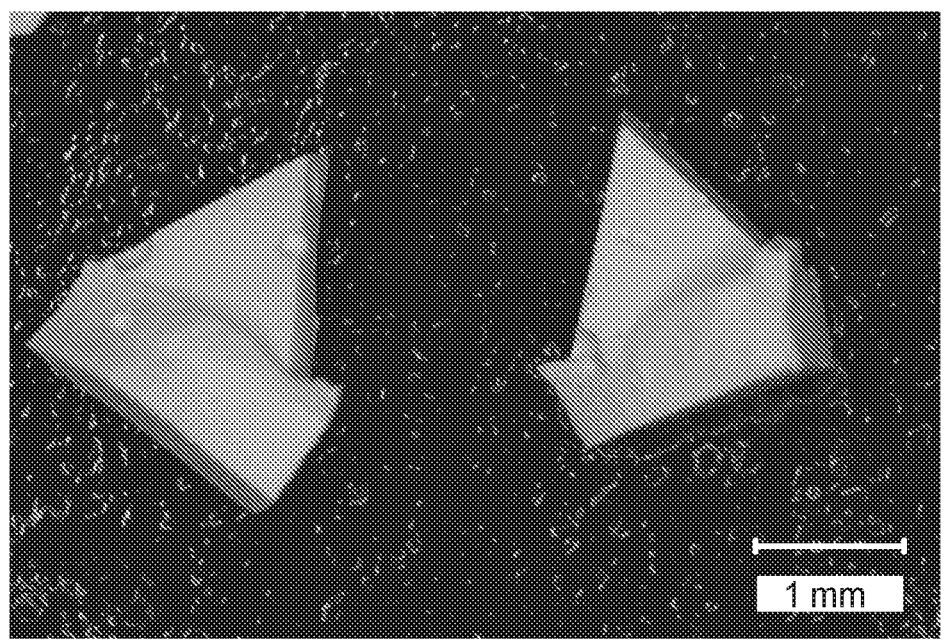

FIGS. 11A and 11B present the optical image of the partially shaped precursor particles made in Example 3.

Example 4

Figure 12:
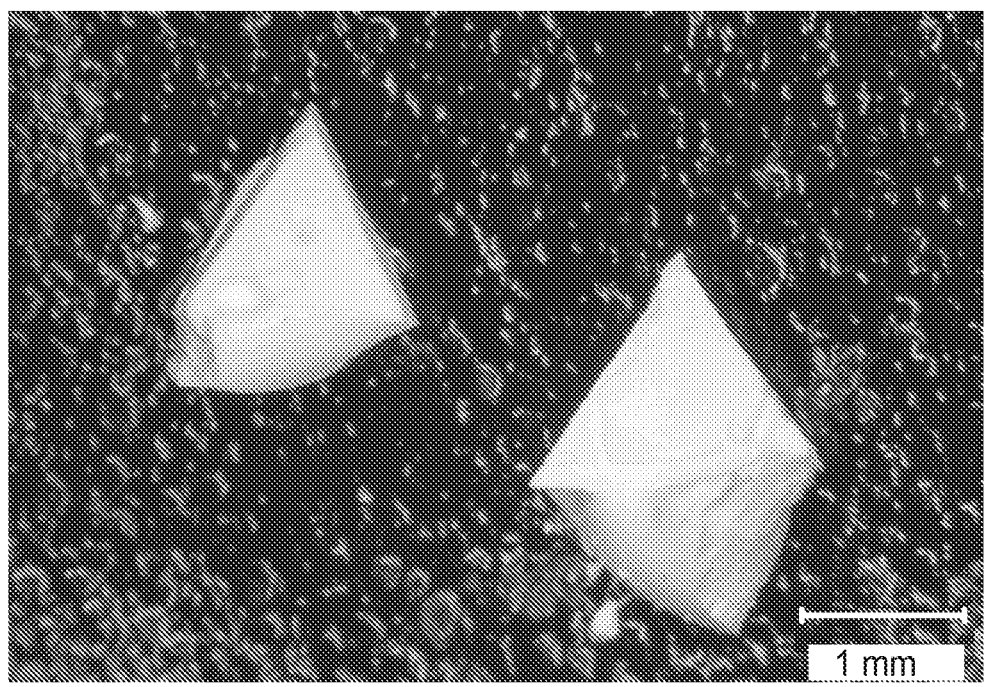

A fourth partially shaped abrasive grain was formed using the same procedure as Example-3, with the exception that the shaped cavities was filled with the Slurry Precursor Pre-Mix using a knife and the base portion of the Slurry Precursor Pre-Mix was applied with a brush. FIG. 12 presents an optical image of the partially shaped precursor particles made in Example 4.

Additional Embodiments

The following exemplary embodiments are provided, the numbering of which is not to be construed as designating levels of importance:

Embodiment 1 includes a partially shaped abrasive particle. The partially shaped abrasive particle includes a shaped portion, engineered to have a polygonal shape, and an irregular portion. The irregular portion is coupled to a base of the shaped portion, forming a single partially shaped abrasive particle.

Embodiment 2 includes the features of Embodiment 1, however the shaped portion and the irregular portion are a single monolith.

Embodiment 3 includes the features of Embodiment 1 or 2, however the shaped portion and the irregular portion are composed of substantially the same material.

Embodiment 4 includes the features of any of Embodiments 1-3, however the shaped portion comprises a different material than the irregular portion.

Embodiment 5 includes the features of any of Embodiments 1-4, however the shaped portion comprises alumina.

Embodiment 6 includes the features of any of Embodiments 1-5, however the shaped portion comprises zirconia.

Embodiment 7 includes the features of Embodiment 6, however the zirconia is present as zirconia nanoparticles.

Embodiment 8 includes the features of Embodiment 6 or 7, however the shaped portion comprises at least 2% zirconia by weight.

Embodiment 9 includes the features of any of Embodiments 6-8, however the shaped portion comprises less than or equal to 40% zirconia by weight.

Embodiment 10 includes the features of any of Embodiments 1-9, however the irregular portion comprises alumina.

Embodiment 11 includes the features of any of Embodiments 1-10, however the shaped portion comprises at least 15% of the particle.

Embodiment 12 includes the features of any of Embodiments 1-11, however the shaped portion comprises at least 30% of the particle.

Embodiment 13 includes the features of any of Embodiments 1-12, however however the shaped portion comprises between 50-90% of the particle by weight.

Embodiment 14 includes the features of any of Embodiments 1-13, however the irregular portion comprises between 10-50% of the particle by weight.

Embodiment 15 includes the features of any of Embodiments 1-14, however the shaped portion comprises at least one triangle-shaped surface.

Embodiment 16 includes the features of Embodiment 15, however the triangle is selected from the group consisting of: an equilateral triangle, an isosceles triangle, and a scalene triangle.

Embodiment 17 includes the features of any of Embodiments 1-16, however the shaped portion comprises at least one quadrilateral-shaped surface.

Embodiment 18 includes the features of any of Embodiments 1-17, however the shaped portion comprises a tetrahedron.

Embodiment 19 includes the features of any of Embodiments 1-18, however the shaped portion comprises two faces that are substantially identical in size.

Embodiment 20 includes the features of any of Embodiments 1-19, however the shaped portion comprises at least one shape feature comprising: an opening, a concave surface, a convex surface, a groove, a ridge, a fractured surface, a sloping sidewall, a low roundness factor, or a perimeter comprising one or more corner points having a sharp tip.

Embodiment 21 includes the features of any of Embodiments 1-20, however the partially shaped abrasive particle is a ceramic partially shaped abrasive particle.

Embodiment 22 includes the features of Embodiment 21, however the shaped abrasive particle comprises alpha alumina, sol-gel derived alpha alumina, or a mixture thereof.

Embodiment 23 includes the features of Embodiment 22, however the shaped abrasive particles comprises a fused aluminum oxide, a heat-treated aluminum oxide, a ceramic aluminum oxide, a sintered aluminum oxide, a silicon carbide material, a titanium diboride, a boron carbide, a tungsten carbide, a titanium carbide, a diamond, a cubic boron nitride, a garnet, a fused alumina-zirconia, a cerium oxide, a zirconium oxide, a titanium oxide or a combination thereof.

Embodiment 24 includes the features of any of Embodiments 1-23, however one of the shaped portion or the irregular portion is responsive to a magnetic field.

Embodiment 25 includes the features of any of Embodiments 1-24, however the shaped portion or the irregular portion comprises a magnetic material.

Embodiment 26 includes the features of Embodiment 25, however the magnetic material at least partially coats the shaped abrasive particle.

Embodiment 27 includes an abrasive article with a backing and a plurality of the partially shaped abrasive particles described in any of Embodiments 1-26. The plurality of partially shaped abrasive particles are attached to the backing.

Embodiment 28 includes the features of Embodiment 27, however the article comprises a blend of the partially shaped abrasive particles and crushed abrasive particles.

Embodiment 29 includes the features of either Embodiment 27 or 28, however the shaped abrasive particles and the crushed abrasive particles comprise the same material or mixture of materials.

Embodiment 30 includes the features of any of Embodiments 27-29, however the abrasive article comprises a belt, a disc, or a sheet.

Embodiment 31 includes the features of any of Embodiments 27-30, however it also includes a make coat adhering the shaped abrasive particles to the backing.

Embodiment 32 includes the features of Embodiment 31, however it also includes a size coat adhering the shaped abrasive particles to the make coat.

Embodiment 33 includes the features of Embodiment 32, however at least one of the make coat and the size coat comprise a phenolic resin, an epoxy resin, a urea-formaldehyde resin, an acrylate resin, an aminoplast resin, a melamine resin, an acrylated epoxy resin, a urethane resin, or mixtures thereof.

Embodiment 34 includes the features of either Embodiment 32 or 33, however at least one of the make coat and the size coat comprises a filler, a grinding aid, a wetting agent, a surfactant, a dye, a pigment, a coupling agent, an adhesion promoter, or a mixture thereof.

Embodiment 35 includes the features of Embodiment 34, however the filler comprises calcium carbonate, silica, talc, clay, calcium metasilicate, dolomite, aluminum sulfate, or a mixture thereof.

Embodiment 36 includes the features of any of Embodiments 27-35, however the backing comprises a flexible material.

Embodiment 37 includes the features of any of Embodiments 27-36, however the backing is selected from the group consisting of: a polymeric film, a metal foil, a woven fabric, a knitted fabric, paper, a vulcanized fiber, a nonwoven, a foam, a screen, a laminate.

Embodiment 38 includes the features of any of Embodiments 27-37, however the backing comprises an additive selected from the group consisting of: a colorant, a processing aid, a reinforcing fiber, a heat stabilizer, a UV stabilizer, and an antioxidant.

Embodiment 39 includes the features of any of Embodiments 27-38, however it also includes a top coat.

Embodiment 40 includes the features of any of Embodiments 27-39, however a majority of the plurality of the partially shaped particles are positioned such that the irregular side faces the backing.

Embodiment 41 includes the features of any of Embodiments 27-39, however substantially all of the plurality of the partially shaped particles are positioned such that the irregular side faces the backing.

Embodiment 42 includes the features of any of Embodiments 27-41, however the abrasive article has a longer working lifetime as compared to an abrasive article with similar sized shaped abrasive particles without an irregular portion.

Embodiment 43 includes the features of any of Embodiments 27-42, however the abrasive article experiences reduced shelling as compared to an abrasive article with similar sized shaped abrasive particles without an irregular portion.

Embodiment 44 is a method of making the partially shaped particles of any of Embodiments 1-26. The method includes filling a mold with a precursor solution, wherein the mold comprises partially shaped cavities configured to impart a shape to the shaped portion. The method also includes drying the precursor solution to form precursor particles. The method also includes removing the precursor particles from the mold such that the irregular portion is formed.

Embodiment 45 includes the features of Embodiment 44, however removing the precursor particles comprises a crushing step.

Embodiment 46 includes the features of either Embodiment 44 or 45, however removing the precursor particles comprises removing an agglomerate of multiple particles and breaking the agglomerate of multiple particles into the plurality of particles such that the irregular portions are formed.

Embodiment 47 includes the features of any of Embodiments 44-46, however the precursor solution is a first precursor solution, and further comprising the step of filling the mold with a second precursor solution.

Embodiment 48 includes the features of Embodiment 47, however filling the mold with the first precursor solution includes filling a plurality of cavities within the partially shaped cavities with the first precursor solution, and filling the mold with the second precursor solution includes filling the rest of the partially shaped cavities with the second precursor solution.

Embodiment 49 includes the features of Embodiment 48, however the first precursor solution comprises zirconia.

Embodiment 50 includes the features of any of Embodiments 44-49, however it also includes calcining the precursor particles.

Embodiment 51 includes the features of Embodiment 50, however it also includes sintering the calcined precursor particles.

What is claimed is:

1. A partially shaped abrasive particle comprising:
   a precisely shaped portion, wherein the shaped portion has a polygonal shape, and wherein the shaped portion comprises a tetrahedron and wherein the shaped portion comprises 15%-95% of the particle;
   an irregular portion; and
   wherein the irregular portion is coupled to a base of the shaped portion, forming the partially shaped abrasive particle.

2. The partially shaped abrasive particle of claim 1, wherein the shaped portion and the irregular portion comprise a monolith.

3. The partially shaped abrasive particle of any of claims 1-2, wherein the shaped portion and the irregular portion are composed of substantially the same material.

4. The partially shaped abrasive particle of claim 1, wherein the shaped portion comprises a different material than the irregular portion.

5. The partially shaped abrasive particle of claim 1, wherein the shaped abrasive particle comprises zirconia nanoparticles.

6. The partially shaped abrasive particle of claim 1, wherein one of the shaped portion or the irregular portion is responsive to a magnetic field.

7. The partially shaped abrasive particle of claim 1, wherein the shaped portion or the irregular portion comprises a coating, and wherein the coating comprises a magnetic material.

8. An abrasive article comprising:
a backing;
a plurality of the partially shaped abrasive particles;
wherein each of the plurality of partially shaped abrasive particles comprise:
a precisely shaped portion, wherein the shaped portion has a polygonal shape;
an irregular portion coupled to a base of the shaped portion, wherein the shaped portion comprises 15%-95% of the particle; and
wherein the plurality of partially shaped abrasive particles are attached to the backing, and
wherein a majority of the plurality of the partially shaped particles are positioned such that the irregular side faces the backing.

9. The abrasive article of claim 8, wherein the article comprises a blend of the partially shaped abrasive particles and crushed abrasive particles.

10. The abrasive article of claim 8, wherein the abrasive article comprises a belt, a disc, or a sheet.

11. The abrasive article of claim 8, wherein the abrasive article has a longer working lifetime as compared to an abrasive article with similar sized shaped abrasive particles without an irregular portion.

12. The abrasive article of claim 8, wherein the abrasive article experiences reduced shelling as compared to an abrasive article with similar sized shaped abrasive particles without an irregular portion.

13. An abrasive article comprising:
a backing;
a plurality of the partially shaped abrasive particles;
wherein each of the plurality of partially shaped abrasive particles comprise:
a precisely shaped portion, wherein the shaped portion has a polygonal shape;
an irregular portion coupled to a base of the shaped portion, wherein the shaped portion 15%-95% of the particle; and
wherein the plurality of partially shaped abrasive particles are attached to the backing, and
wherein a majority of the plurality of the partially shaped particles are positioned such that the irregular side faces the backing.

14. The abrasive article of claim 13, wherein the article comprises a blend of the partially shaped abrasive particles and crushed abrasive particles.

15. The abrasive article of claim 13, wherein the abrasive article comprises a belt, a disc, or a sheet.

16. The abrasive article of claim 13, wherein the abrasive article has a longer working lifetime as compared to an abrasive article with similar sized shaped abrasive particles without an irregular portion.

17. The abrasive article of claim 13, wherein the abrasive article experiences reduced shelling as compared to an abrasive article with similar sized shaped abrasive particles without an irregular portion.

* * * * *